US010857858B2

(12) United States Patent
Otsuka et al.

(10) Patent No.: US 10,857,858 B2
(45) Date of Patent: Dec. 8, 2020

(54) DOOR INNER PANEL AND METHOD FOR MANUFACTURING DOOR INNER PANEL

(71) Applicant: NIPPON STEEL & SUMITOMO METAL CORPORATION, Tokyo (JP)

(72) Inventors: Kenichiro Otsuka, Tokyo (JP); Atsushi Ono, Tokyo (JP); Yoshiyuki Kaseda, Tokyo (JP); Yoshiaki Nakazawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 163 days.

(21) Appl. No.: 16/085,872

(22) PCT Filed: Mar. 16, 2017

(86) PCT No.: PCT/JP2017/010744
§ 371 (c)(1),
(2) Date: Sep. 17, 2018

(87) PCT Pub. No.: WO2017/164079
PCT Pub. Date: Sep. 28, 2017

(65) Prior Publication Data
US 2019/0100084 A1 Apr. 4, 2019

(30) Foreign Application Priority Data

Mar. 23, 2016 (JP) ................... 2016-059198

(51) Int. Cl.
*B60J 5/04* (2006.01)
*B21D 22/26* (2006.01)
(Continued)

(52) U.S. Cl.
CPC ............. *B60J 5/0411* (2013.01); *B21D 22/20* (2013.01); *B21D 22/26* (2013.01); *B21D 24/00* (2013.01);
(Continued)

(58) Field of Classification Search
CPC ...... B60J 5/0455; B60J 5/0411; B60J 5/0451; B60J 5/0413; B60J 5/0426; B60J 5/0433;
(Continued)

(56) References Cited

U.S. PATENT DOCUMENTS 5,446,999 A * 9/1995 Inaba ..................... B60J 5/0415
296/146.5
5,600,991 A 2/1997 Munzen
(Continued)

FOREIGN PATENT DOCUMENTS

JP 3-35825 A 2/1991
JP 7-329570 A 12/1995
(Continued)

OTHER PUBLICATIONS

Russian Decision to Grant and Search Report, dated Jun. 25, 2019, for corresponding Russian Application No. 2018134787, with an English translation of the Russian Decision to Grant.
(Continued)

*Primary Examiner* — Chi Q Nguyen
(74) *Attorney, Agent, or Firm* — Birch, Stewart, Kolasch & Birch, LLP

(57) ABSTRACT

This door inner panel is a door inner panel formed of a metal sheet and includes a first panel portion having a first top sheet portion and a first standing wall portion connected to the first top sheet portion, a second panel portion having a second top sheet portion disposed with a gap with the first top sheet portion of the first panel portion and a second standing wall portion connected to the second top sheet portion, a flange portion connected to the first standing wall portion and the second standing wall portion, and a flat sheet portion disposed between the first panel portion and the second panel portion, the first standing wall portion and the second standing wall portion respectively have a level
(Continued)

difference portion, and both ends of the flat sheet portion are integrated with the flange portion or the level difference portions.

17 Claims, 11 Drawing Sheets

(51) Int. Cl.
 *B21D 53/88* (2006.01)
 *B21D 24/00* (2006.01)
 *B21D 22/20* (2006.01)
 *B60J 5/00* (2006.01)

(52) U.S. Cl.
 CPC ............ *B21D 53/88* (2013.01); *B60J 5/00* (2013.01); *B60J 5/0413* (2013.01); *B60J 5/0426* (2013.01); *B60J 5/0443* (2013.01)

(58) Field of Classification Search
 CPC . B60J 5/00; B21D 24/00; B21D 22/26; B21D 53/88; B21D 22/20; B21D 22/22; B01D 2259/40026; E05Y 2900/132; E05Y 2900/531; E06B 3/485; E05D 15/24
 USPC .......... 49/502, 503, 506; 296/187.12, 146.6, 296/146.5
 See application file for complete search history.

(56) References Cited

U.S. PATENT DOCUMENTS

| | | | | |
|---|---|---|---|---|
| 7,530,624 | B2* | 5/2009 | Endo | B60J 5/0426 |
| | | | | 296/146.6 |
| 7,866,730 | B2* | 1/2011 | Lewis | B29C 51/267 |
| | | | | 296/146.5 |
| 8,932,700 | B2* | 1/2015 | Shimizu | E04C 2/326 |
| | | | | 428/174 |
| 10,030,388 | B2* | 7/2018 | Yonebayashi | E04C 2/08 |
| 2005/0046227 | A1 | 3/2005 | White et al. | |
| 2009/0236871 | A1 | 9/2009 | Shibasaki | |
| 2009/0314041 | A1* | 12/2009 | Fujiwara | E05B 77/10 |
| | | | | 70/102 |
| 2010/0123263 | A1* | 5/2010 | Lewis | B29C 51/267 |
| | | | | 264/101 |
| 2014/0203590 | A1 | 7/2014 | Roy et al. | |
| 2015/0021954 | A1* | 1/2015 | Hayakawa | B62D 25/2036 |
| | | | | 296/187.12 |
| 2016/0273222 | A1 | 9/2016 | Yonebayashi et al. | |
| 2018/0001368 | A1* | 1/2018 | Otsuka | B21D 22/022 |
| 2018/0264535 | A1* | 9/2018 | Otsuka | B21D 35/005 |
| 2019/0009654 | A1* | 1/2019 | Otsuka | B21D 47/00 |

FOREIGN PATENT DOCUMENTS

| | | |
|---|---|---|
| JP | 2001-88553 A | 4/2001 |
| JP | 2007-296953 A | 11/2007 |
| JP | 2008-94353 A | 4/2008 |
| JP | 2013-112133 A | 6/2013 |
| KR | 20-1999-0003105 U | 1/1999 |
| RU | 2116854 C1 | 8/1998 |
| RU | 81932 U1 | 4/2009 |
| SU | 1196076 A | 12/1985 |
| WO | WO 2015/080084 A1 | 6/2015 |

OTHER PUBLICATIONS

International Search Report for PCT/JP2017/010744 dated May 16, 2017.
Written Opinion of the International Searching Authority for PCT/JP2017/010744 (PCT/ISA/237) dated May 16, 2017.
Korean Notice of Allowance dated Aug. 26, 2019, issued in Korean Patent Application 10-2018-7028070, with machine translation.
Extended European Search Report dated Oct. 30, 2019, for counterpart European Application No. 17770121.6.

* cited by examiner

C-E

DOOR INNER PANEL AND METHOD FOR MANUFACTURING DOOR INNER PANEL

TECHNICAL FIELD OF THE INVENTION

The present invention relates to a car door inner panel and a method for manufacturing a door inner panel.

Priority is claimed on the basis of Japanese Patent Application No. 2016-059198, filed on Mar. 23, 2016, the content of which is incorporated herein by reference.

RELATED ART

A car door is manufactured by combining mainly a door inner panel and a door outer panel. To a car door, a window, a window-driving apparatus, an acoustic speaker, a knob, and the like are attached. In order to store these components, a space is required between the door inner panel and the door outer panel. Therefore, for example, a standing wall portion is provided in the door inner panel. In addition, when the car door is closed, it is necessary to seal the inside of the car with the door. Therefore, for example, a level difference portion is provided to the standing wall portion of the door inner panel. The level difference portion of the standing wall portion faces a pillar or the like of a car body, whereby the sealing property of the inside of the car is ensured.

A door inner panel that is used for a car side door or the like is formed by pressing a metal sheet such as a steel sheet. Generally, the door inner panel has a complicated shape, and thus there are cases in which the shape of the metal sheet is significantly changed. In this case, there are cases in which cracks or wrinkles are generated in the formed door inner panel. Therefore, as a material for the door inner panel, a metal sheet having a high workability is used. The metal sheet having a high workability has a low strength, and thus the strength of the door inner panel is also low. Therefore, there are many cases in which a belt line reinforcement, a door impact beam, or the like is attached to the door inner panel as a reinforcement member.

The structure of the door inner panel is disclosed in Patent Documents 1 to 3.

A door inner panel disclosed in Patent Document 1 includes a belt line reinforcement.

The belt line reinforcement is joined to a belt line portion of the door inner panel in a car body front and rear direction. Therefore, the belt line reinforcement bears an impact burden in the car body front and rear direction and is capable of effectively reducing a bending moment excerting on the belt line portion, which is described in Patent Document 1.

In a door inner panel disclosed in Patent Document 2, when an impact is exerted on a side surface of a car body, the door inner panel and a belt line reinforcement come into contact with each other, and a load-absorbing portion of the door inner panel deforms. Therefore, the load-absorbing portion absorbs a part of the load being exerted in a thickness direction of the door inner panel, and thus the stiffness of the door inner panel is ensured, which is described in Patent Document 2.

A side door disclosed in Patent Document 3, a rear end portion and a front end portion of a belt line reinforcement formed by hot stamping has a lower strength and a lower stiffness than a main body portion. Therefore, when an impact load is exerted from a front surface of a car body, the rear end portion of the belt line reinforcement plastically deforms, and the contact area with a center pillar increases. Therefore, the impact energy can be absorbed by the deformation of the rear end portion of the belt line reinforcement, which is described in Patent Document 3.

PRIOR ART DOCUMENT

Patent Document

[Patent Document 1] Japanese Unexamined Patent Application, First Publication No. 2007-296953
[Patent Document 2] Japanese Unexamined Patent Application, First Publication No. 2008-94353
[Patent Document 3] Japanese Unexamined Patent Application, First Publication No. 2013-112133

DISCLOSURE OF THE INVENTION

Problems to be Solved by the Invention

However, for the door inner panels of Patent Documents 1, 2, and 3, a separate reinforcement member such as the belt line reinforcement is indispensable in order to ensure the impact characteristics. Therefore, doors manufactured using the door inner panels of Patent Documents 1, 2, and, 3 have a low production efficiency and a high cost.

The present invention has been made in consideration of the above-described circumstances, and an object of the present invention is to provide a door inner panel which is lightweight and excellent in terms of impact characteristics and a method for manufacturing a door inner panel having an excellent productivity.

Means for Solving the Problem

The outline of the present invention is as described below.

(1) A first aspect of the present invention is a door inner panel formed of a metal sheet, the door inner panel including: a first panel portion having a first top sheet portion and a first standing wall portion connected to the first top sheet portion, a second panel portion having a second top sheet portion disposed with a gap with the first top sheet portion of the first panel portion and a second standing wall portion connected to the second top sheet portion, a flange portion connected to the first standing wall portion and the second standing wall portion, and a flat sheet portion disposed between the first panel portion and the second panel portion, in which the first standing wall portion and the second standing wall portion respectively have a level difference portion, and both ends of the flat sheet portion are integrated with the flange portion or the level difference portions.

(2) In the door inner panel according to (1), an opening portion may be formed in at least one of the first top sheet portion and the second top sheet portion.

(3) In the door inner panel according to (1), the flat sheet portion may have a wall portion connected to the first standing wall portion and the second standing wall portion.

(4) In the door inner panel according to (1), a reinforcement component connecting the first standing wall portion and the second standing wall portion may be further provided.

(5) In the door inner panel according to (1), at least one of a recessed portion and a protruded portion may be formed in the flat sheet portion.

(6) In the door inner panel according to (1), a tensile strength may be 1,200 MPa or more.

(7) In the door inner panel according to (6), a C content may be 0.11% to 0.35%, by mass %.

(8) In the door inner panel according to (7), a maximum sheet thickness portion $T1_{MAX}$ (mm) in the first top sheet portion, a minimum sheet thickness portion $T1_{MIN}$ (mm) in the first top sheet portion, a maximum sheet thickness portion $T2_{MAX}$ (mm) in the second top sheet portion, and a minimum sheet thickness portion $T2_{MIN}$ (mm) in the second top sheet portion may satisfy Expression (a) and Expression (b).

$(T1_{MAX}-T1_{MIN})\times 100/T1_{MAX}<15$      Expression (a)

$(T2_{MAX}-T2_{MIN})\times 100/T2_{MAX}<15$      EXPRESSION (b)

(9) In the door inner panel according to (1), a tensile strength may be 340 to 980 MPa.

(10) In the door inner panel according to (9), a C content may be 0.001% to 0.150%, by mass %.

(11) In the door inner panel according to (10), a maximum sheet thickness portion $T1_{MAX}$ (mm) in the first top sheet portion, a minimum sheet thickness portion $T1_{MIN}$ (mm) in the first top sheet portion, a maximum sheet thickness portion $T2_{MAX}$ (mm) in the second top sheet portion, and a minimum sheet thickness portion $T2_{MIN}$ (mm) in the second top sheet portion may satisfy Expression (c) and Expression (d).

$(T1_{MAX}-T1_{MIN})\times 100/T1_{MAX}<20$      Expression (c)

$(T2_{MAX}-T2_{MIN})\times 100/T2_{MAX}<20$      Expression (d)

(12) In the door inner panel according to (1), heights of the first standing wall portion and the second standing wall portion may be respectively 40 mm or more.

(13) In the door inner panel according to (1), in the flat sheet portion, a width of a minimum width portion may be 30 mm or more, and a width of a maximum width portion may be 200 mm or less.

(14) A second aspect of the present invention is a method for manufacturing the door inner panel according to any one of (1) to (13), the method including: preparing a blank material which is made of the metal sheet and has a first flat sheet portion, a second flat sheet portion, and a third flat sheet portion disposed between the first flat sheet portion and the second flat sheet portion; and carrying out press working in a cold or hot manner on the first flat sheet portion and the second flat sheet portion of the blank material using a pressing apparatus including a die, an inside punch facing the die, an outside punch facing the die and disposed outside the inside punch, and a blank holder and forming the blank material to the door inner panel, in which, in the carrying out of the press working, the inside punch is configured to work a region formed in the first top sheet portion of the door inner panel in the first flat sheet portion of the blank material and a region formed in the second top sheet portion of the door inner panel in the second flat sheet portion of the blank material, the outside punch is configured to work a region formed in the level difference portion of the door inner panel in the first flat sheet portion of the blank material and a region formed in the level difference portion of the door inner panel in the second flat sheet portion of the blank material, and the working of the blank material by the outside punch is completed earlier before the working of the blank material by the inside punch.

(15) In the method for manufacturing the door inner panel according to (14), in the carrying out of the press working, the inside punch and the outside punch may further work a part of the third flat sheet portion of the blank material.

(16) In the method for manufacturing the door inner panel according to (14), in the carrying out of the press working, pressing of the blank material by the inside punch may begin before pressing of the blank material by the outside punch is completed.

(17) In the method for manufacturing the door inner panel according to (14), in a case in which the carrying out of the press working is carried out in the hot manner, a heating temperature may be an Ac3 point or higher.

Effects of the Invention

In the door inner panel according to (1), the first standing wall portion and the second standing wall portion have the level difference portions, and thus it is possible to enhance the stiffness of the door inner panel in addition to the improvement of the sealing property of a car.

Furthermore, both ends of the flat sheet portion disposed between the first panel portion and the second panel portion are integrally connected with the flange portion or the level difference portions. The flat sheet portion integrated with the door inner panel functions as a door impact beam, and thus it is not necessary to provide a separate door impact beam therein. In addition, according to this structure, when the door inner panel is combined with a door outer panel or the like, the flat sheet portion is disposed at a location close to the door outer panel. Therefore, the impact energy being imparted from the door outer panel side can be efficiently absorbed in the flat sheet portion.

Therefore, it is possible to exhibit excellent impact characteristics while reducing the weight of the door inner panel.

In the door inner panel according to (2), the opening portion is formed in the first top sheet portion or the second top sheet portion, and thus weight reduction is possible.

Furthermore, in the first top sheet portion or the second top sheet portion, the vicinity of the opening portion can be worked by stretch flange deformation, and thus it becomes possible to increase the height of the first standing wall portion or the second standing wall portion (the pressing forming depth measured from the flange portion as the criterion). Therefore, it is possible to enhance the stiffness of the door inner panel. In addition, when the door inner panel is combined with a door outer panel or the like, the flat sheet portion can be disposed at a location closer to the door outer panel, and thus it is possible to further improve the impact characteristics.

In the door inner panel according to (3), the flat sheet portion has the wall portion connected to the first standing wall portion and the second standing wall portion, and thus the cross section of the flat sheet portion becomes a U-like shape, and the cross-sectional secondary moment of the flat sheet portion is increased. Therefore, the impact energy being absorbed by the flat sheet portion increases, and thus it becomes possible to further improve the impact characteristics.

In the door inner panel according to (4), the first standing wall portion and the second standing wall portion that are separated from each other with the flat sheet portion therebetween are connected to each other using the reinforcement component, and thus it becomes possible to enhance the stiffness of the door inner panel. Therefore, it becomes possible to further improve the impact characteristics.

In the door inner panel according to (5), the recessed portion or the protruded portion is formed in the flat sheet portion, and thus the cross-sectional secondary moment of the flat sheet portion is increased. Therefore, the impact energy being absorbed by the flat sheet portion increases, and thus it becomes possible to further improve the impact characteristics.

In the method for manufacturing the door inner panel according to (14), it is possible to form the door inner panel with a single round of press working.

Here, although the door inner panel is said to be formed with a single round of press working, there are cases in which a cutting step or a pick up step is provided after the pressing step.

Furthermore, the working of the blank material by the inside punch is completed after the working of the blank material by the outside punch is completed. Therefore, the forming of the first top sheet portion and the second top sheet portion by the inside punch is completed in a state in which the level difference portion is restrained by the outside punch and the die. Therefore, in any of the cold and hot press working steps, the generation of forming defects such as cracks or wrinkles in the door inner panel can be limited.

Therefore, it is possible to efficiently manufacture the door inner panel while limiting forming defects.

In the method for manufacturing the door inner panel according to (15), it is possible to form the door inner panel in which the flat sheet portion has the wall portion with a single round of press working.

Here, although the door inner panel is said to be formed with a single round of press working, there are cases in which a cutting step or a pick up step is provided after the pressing step.

In addition, in the method for manufacturing the door inner panel according to (16), the inside punch presses the blank material to a certain extent before the level difference portion is restrained by the outside punch and the die, and thus it is possible to suppress a decrease in the sheet thickness of the top sheet portion. Therefore, it is possible to more reliably suppress the generation of forming defects such as cracks or wrinkles in the door inner panel.

DETAILED DESCRIPTION

Figure 1A:
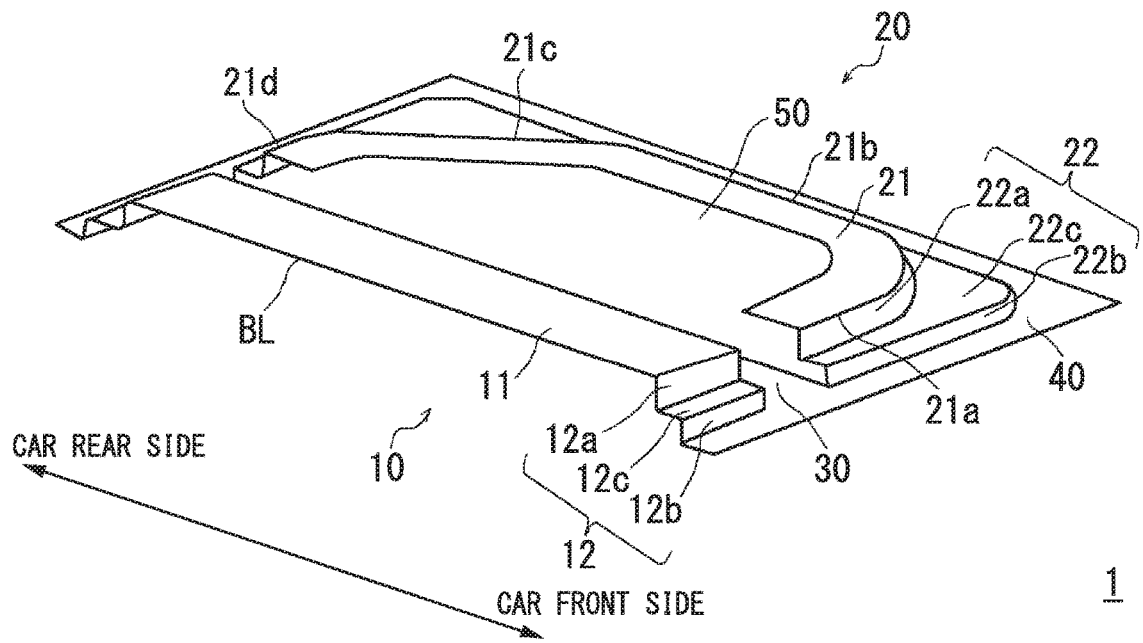
FIG. 1A is a perspective view of a door inner panel according to a first embodiment of the present invention seen from an inside of a car.

Hereinafter, the present invention will be described in detail on the basis of a first embodiment and a second embodiment with reference to drawings. In the drawings, the same or corresponding portion will be given the same reference symbol, and a description thereof will not be repeated.

First Embodiment

Hereinafter, a door inner panel 1 according to the first embodiment of the present invention will be described with reference to FIG. 1A and FIG. 1B.

A door inner panel 1 according to the present embodiment is obtained by press forming using a steel sheet S as a blank material. FIG. 1A is a perspective view of the door inner panel 1 according to the present embodiment seen from the inside of a car, and FIG. 1B is a perspective view of the door inner panel 1 according to the present embodiment seen from the outside of the car.

Figure 1B:
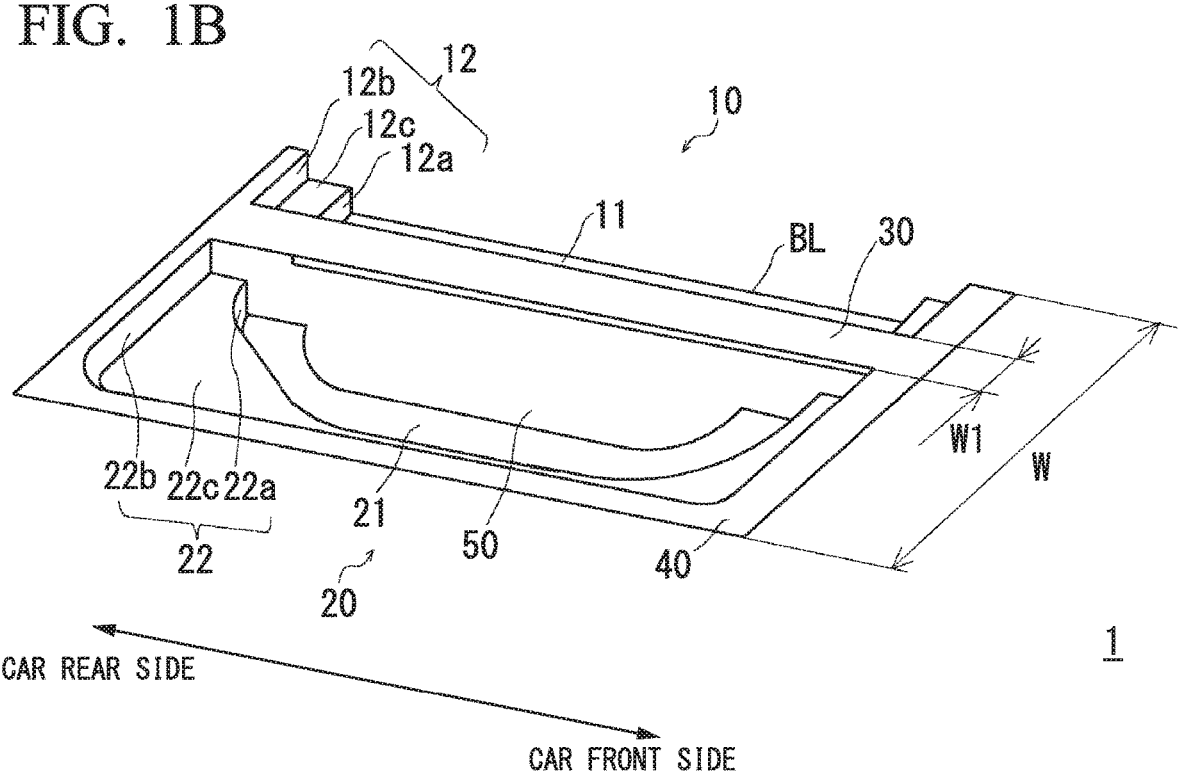
FIG. 1B is a perspective view of the door inner panel according to the above-described embodiment seen from an outside of the car.

As shown in FIG. 1A and FIG. 1B, the door inner panel 1 includes a first panel portion 10, a second panel portion 20, a flat sheet portion 30, and a flange portion 40. In the following description, there will be a case in which a direction perpendicular to a surface of the flange portion 40 is referred to as a pressing direction.

The first panel portion 10 has a first top sheet portion 11 being formed at a location separated from the flange portion 40 in the pressing direction and a first standing wall portion 12 connected to an end edge of the first top sheet portion 11.

The first standing wall portion 12 is a portion which is provided so as to face a pillar or the like of a car body and enhances the sealing property of the inside of the car.

The first standing wall portion 12 includes top sheet portion-side first standing wall portions 12a that bend from sidelines of the first top sheet portion 11 on car front side and rear side and extend in the pressing direction, flange portion-side first standing wall portions 12b that bend from the flange portion 40 and extend in the pressing direction, and first level difference portions 12c connecting the top sheet portion-side first standing wall portions 12a and the flange portion-side first standing wall portions 12b. The first level difference portions 12c are formed substantially parallel to the surface of the flange portion 40 between the flange portion 40 and the first top sheet portion 11.

The second panel portion 20 is formed separated from the first panel portion 10 through the flat sheet portion 30 in the case of being seen in a planar view.

The second panel portion 20 has a second top sheet portion 21 being formed at a location separated from the flange portion 40 in the pressing direction and a second standing wall portion 22 connected to an end edge of the second top sheet portion 21.

The second standing wall portion 22 is, similar to the first standing wall portion 12, a portion which is provided so as to face the pillar or the like of the car body and enhances the sealing property of the inside of the car.

The second standing wall portion 22 includes a top sheet portion-side second standing wall portion 22a that bends from four outside sidelines 21a, 21b, 21c, and 21d of the second top sheet portion 21 and extends in the pressing direction, a flange portion-side second standing wall portion 22b that bends from the flange portion 40 and extends in the pressing direction, and a second level difference portion 22c connecting the top sheet portion-side second standing wall portion 22a and the flange portion-side second standing wall portion 22b. The second level difference portion 22c is formed substantially parallel to the surface of the flange portion 40 between the flange portion 40 and the second top sheet portion 21.

The top sheet portion-side second standing wall portion 22a is continuously formed along the four outside sidelines 21a, 21b, 21c, and 21d, which are adjacent to each other, of the second top sheet portion 21, and thus the stiffness of the door inner panel 1 can be enhanced.

The first top sheet portion 11 has a quadrilateral planar shape, and the second top sheet portion 21 has a pentagonal planar shape. Furthermore, a sideline of the first top sheet portion 11 on a car upper side forms a belt line BL.

In the second top sheet portion 21, an opening portion 50 is formed so as to let a circumferential edge portion adjacent to the four outside sidelines 21a, 21b, 21c, and 21d of the second top sheet portion 21 remain. An acoustic speaker, a knob, and the like are attached to a location corresponding to the opening portion 50.

In a case in which the opening portion 50 is formed in the second top sheet portion 21 as in the door inner panel 1 according to the present embodiment, it becomes easy to carry out stretch flange deformation by the widening of the opening portion 50 during press working. Therefore, not only is weight reduction achieved by the cutting of the weight, but the generation of forming defects such as cracks or wrinkles can be limited.

The flange portion 40 is formed so as to connect the flange portion-side first standing wall portion 12b and the flange portion-side second standing wall portion 22b in the periphery of the first panel portion 10 and the second panel portion 20.

The flat sheet portion 30 is a portion that plays a role of a door impact beam and is formed in a band shape so as to partition the first panel portion 10 and the second panel portion 20 in a planar view. The flat sheet portion 30 is formed in a band shape (a linear shape), and thus the shape of a die is simple, and the manufacturing costs can be limited.

The flat sheet portion 30 is integrally formed with the flange portion 40. Therefore, it is not necessary to attach a separate door impact beam to the door inner panel, and thus it is possible to realize the weight reduction of the door inner panel. Furthermore, end portions of the flat sheet portion 30 are preferably formed on the same surface as the flange portion 40.

As shown in FIG. 1B, in a case in which the width of the flat sheet portion 30 is represented by W1, and the width of the door inner panel 1 is represented by W, the ratio W1/W of W1 to W is preferably 0.05 or more and 0.6 or less.

When the ratio W1/W is too small, the bending strength of the flat sheet portion 30 is low, and the flat sheet portion 30 is not capable of sufficiently absorbing the impact energy. Therefore, a preferred lower limit of the ration W1/W is 0.05.

When the ratio W1/W is too great, the area of the first panel portion 10 and the second panel portion 20 decreases, and thus it becomes difficult to ensure the stiffness of the door inner panel 1. In addition, the area of the flat sheet portion 30 excessively increases, and the attachment of a component such as a speaker becomes difficult. Therefore, a preferred upper limit of the ratio W1/W is 0.6.

For example, it is preferable that, in the flat sheet portion 30, the width of the minimum width portion is set to 30 mm or more and the width of the maximum width portion is set to 200 mm or less.

The flat sheet portion 30 is preferably provided in a region corresponding to a door lock striker of the car. As shown in FIG. 1A and FIG. 1B, in the region provided with the flat sheet portion 30, there is a gap between the first standing wall portion 12 and the second standing wall portion 22. This is because a hook for door lock or the like can be stored in this gap.

In the door inner panel 1 according to the present embodiment, both ends of the flat sheet portion 30 are connected to the flange portion 40, and thus, when the door inner panel 1 is combined with a door outer panel or the like, the flat sheet portion 30 is provided at a location close to the door outer panel. Therefore, the impact characteristics of a door can be improved. Hereinafter, this fact will be described in detail.

Figure 2A:
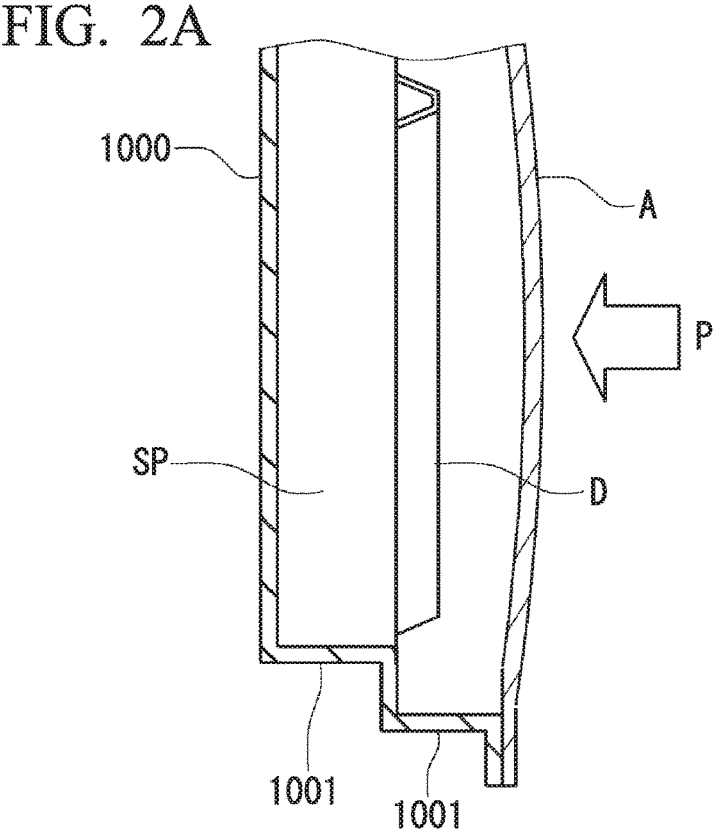
FIG. 2A is a schematic view of a cross section of an ordinary car side door perpendicular to a car body up and down direction.

FIG. 2A is a schematic view of a cross section of an ordinary car side door perpendicular to a car body up and down direction.

The side door is structured by combining a door outer panel A and a door inner panel 1000. A space SP is a space between the door outer panel A and the door inner panel 1000. In the space SP, an acoustic speaker, a window, a window-driving apparatus, and the like are stored. When the side impact of a car occurs, a load P (a white arrow in FIG. 2A) is exerted on the door outer panel A. Due to the load P, the door outer panel A deforms, and a standing wall portion 1001 of the door inner panel 1000 deforms. The standing wall portion 1001 of the door inner panel 1000 absorbs the impact energy attributed to the load P. That is, in order to improve the impact characteristics of the side door, it is necessary to improve the strength of the door inner panel.

However, the material of the door inner panel 1000 of the related art is a soft steel sheet having a low strength. This is because, as described above, the shape of the door inner panel is complicated and working of the door inner panel is difficult. The soft steel sheet is, for example, a steel sheet having a tensile strength of approximately 270 MPa. Therefore, it is indispensable to reinforce car side doors of the related art with a separate reinforcement member such as a door impact beam D shown in FIG. 2A.

In the case of a side door provided with a reinforcement member such as the door impact beam D, the door outer panel A comes into contact with the door impact beam D when the door outer panel A deforms toward the inside of the car due to the load P. Therefore, the impact energy is absorbed not only by the door inner panel 1000 but also by the door impact beam D, and thus the impact characteristics of the side door improve.

However, the door impact beam D which is a separate member needs to be attached to the door inner panel 1000, and thus assembled doors of the related art are heavy, and the absorbed energy per unit weight (absorbed energy weight efficiency) is poor. In addition, the attachment of a separate member is required, and thus the manufacturing costs of doors of the related art are high, and the production efficiency is also low.

Figure 2B:
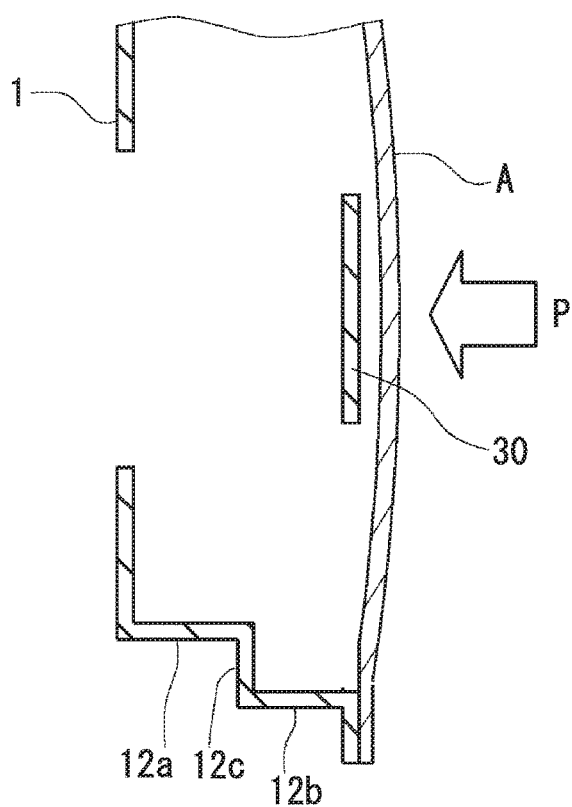
FIG. 2B is a schematic view of a cross section of a side door to which the door inner panel according to the above-described embodiment is applied perpendicular to the car body up and down direction.

FIG. 2B is a schematic view of a cross section of a side door to which the door inner panel 1 according to the present embodiment is applied perpendicular to the car body up and down direction. The side door includes the door inner panel 1 and the door outer panel A. The door outer panel A is disposed on a car outside of the door inner panel 1 and joined with the door inner panel 1.

In this side door, the flat sheet portion 30 of the door inner panel 1 according to the present embodiment is disposed at a location close to the door outer panel A. Therefore, when the door outer panel A deforms toward the inside of a car due to a load, the door outer panel A comes into contact with the flat sheet portion 30. Therefore, the impact energy is first absorbed in the flat sheet portion 30 out of the respective members of the door inner panel 1, and thus the impact characteristics of the side door improve.

As described above, the flat sheet portion 30 of the door inner panel 1 according to the present embodiment functions as an alternative of the door impact beam, and thus side doors to which the door inner panel 1 according to the present embodiment is applied have excellent impact characteristics even without having the door impact beam.

Next, the material of the door inner panel 1 according to the present embodiment will be described.

The door inner panel 1 according to the present embodiment is obtained by press forming using the steel sheet S as a blank material, but the characteristics of the steel sheet S are preferably selected depending on whether hot press forming is carried out or cold press forming is carried out.

In a case in which the door inner panel 1 is press-formed by hot press forming, it is preferable to use the steel sheet S having a component so that a tensile strength of 1,200 MPa or more can be obtained by press-forming the steel sheet S having a tensile strength of 500 Mpa to 1,000 MPa in a state of being heated to an Ac3 point or higher and then quenching the steel sheet.

Particularly, the carbon content (C content) of the steel sheet S is preferably 0.11% or more and 0.35% or less by mass %.

In a case in which the C content is 0.11% or more, it is possible to exhibit favorable hardenability, and it becomes easy to set the tensile strength of the door inner panel 1 to 1,200 MPa or more, which is preferable. The C content is more preferably 0.15% or more.

On the other hand, in a case in which the C content is 0.35% or less, welding defects can be limited, which is preferable. The C content is more preferably 0.30% or less.

Components such as Si, Mn, P, S, Al, B, and the like may be appropriately adjusted.

In the case of press-forming the door inner panel 1 according to the present embodiment using the steel sheet S having a high strength of 440 MPa or more, it is necessary to carry out a countermeasure so as to prevent the generation of wrinkles or cracks in, particularly, the first top sheet portion 11 and the second top sheet portion 21.

In the first top sheet portion 11 and the second top sheet portion 21, places in which local sheet thickness reduction occurs act as a cause for the generation of cracks, and thus, in order to enhance the impact characteristics, the sheet thickness is preferably uniform in the first top sheet portion 11 and the second top sheet portion 21.

Therefore, in the case of employing hot press forming, in a case in which the maximum sheet thickness portion in the first top sheet portion 11 is represented by $T1_{MAX}$ (mm), and the minimum sheet thickness portion in the first top sheet portion 11 is represented by $T1_{MIN}$ (mm), Expression (1) is preferably satisfied.

$$(T1_{MAX}-T1_{MIN})\times 100/T1_{MAX}<15 \qquad \text{Expression (1)}$$

Similarly, in a case in which the maximum sheet thickness portion in the second top sheet portion 21 is represented by $T2_{MAX}$ (mm), and the minimum sheet thickness portion in the second top sheet portion 21 is represented by $T2_{MIN}$ (mm), Expression (2) is preferably satisfied.

$$(T2_{MAX}-T2_{MIN})\times 100/T2_{MAX}<15 \qquad \text{Expression (2)}$$

In the case of press-forming the door inner panel 1 by cold press forming, a steel sheet having a tensile strength of 340 MPa to 980 MPa is preferably used.

Particularly, the carbon content (C content) of the steel sheet S is preferably 0.001% to 0.150%, by mass %.

In a case in which the C content is 0.001% or more, it is easy to set the tensile strength of the door inner panel 1 to 340 MPa or more, which is preferable. The C content is more preferably 0.08% or more.

On the other hand, in a case in which the C content is 0.150% or less, favourable pressing workability can be exhibited, which is preferable. The C content is more preferably 0.12% or less.

The components such as Si, Mn, P, S, Al, B, and the like may be appropriately adjusted.

Similar to the case of press-forming the door inner panel 1 by hot press forming, in the case of press-forming the door inner panel 1 by hot press forming, it is necessary to carry out a countermeasure so as to prevent the generation of wrinkles or cracks in, particularly, the first top sheet portion 11 and the second top sheet portion 21. In the first top sheet portion 11 and the second top sheet portion 21, places in which local sheet thickness reduction occurs act as a cause for the generation of cracks, and thus, in order to enhance the impact characteristics, the sheet thickness is preferably uniform in the first top sheet portion 11 and the second top sheet portion 21.

Therefore, in the case of employing cold press forming, in a case in which the maximum sheet thickness portion in the first top sheet portion 11 is represented by $T1_{MAX}$ (mm), and the minimum sheet thickness portion in the first top sheet portion 11 is represented by $T1_{MIN}$ (mm), Expression (3) is preferably satisfied.

$$(T1_{MAX}-T1_{MIN})\times 100/T1_{MAX}<20 \qquad \text{Expression (3)}$$

Similarly, in a case in which the maximum sheet thickness portion in the second top sheet portion 21 is represented by $T2_{MAX}$ (mm), and the minimum sheet thickness portion in the second top sheet portion 21 is represented by $T2_{MIN}$ (mm), Expression (4) is preferably satisfied.

$$(T2_{MAX} - T2_{MIN}) \times 100 / T2_{MAX} < 20 \qquad \text{Expression (4)}$$

Furthermore, in order to set the sheet thickness to be uniform in the first top sheet portion 11 and the second top sheet portion 21 even in the case of employing any of hot press forming or cold press forming, it is preferable to employ a manufacturing method in which the working of the first top sheet portion 11 and the second top sheet portion 21 is completed after the working of the first level difference portion 12c and the second level difference portion 22c is completed as in a method for manufacturing a door inner panel described below.

Hereinafter, a variety of modification examples of the door inner panel 1 according to the above-described embodiment will be described with reference to FIG. 3, FIG. 4, FIG. 5A, and FIG. 5B.

First Modification Example

Figure 3:
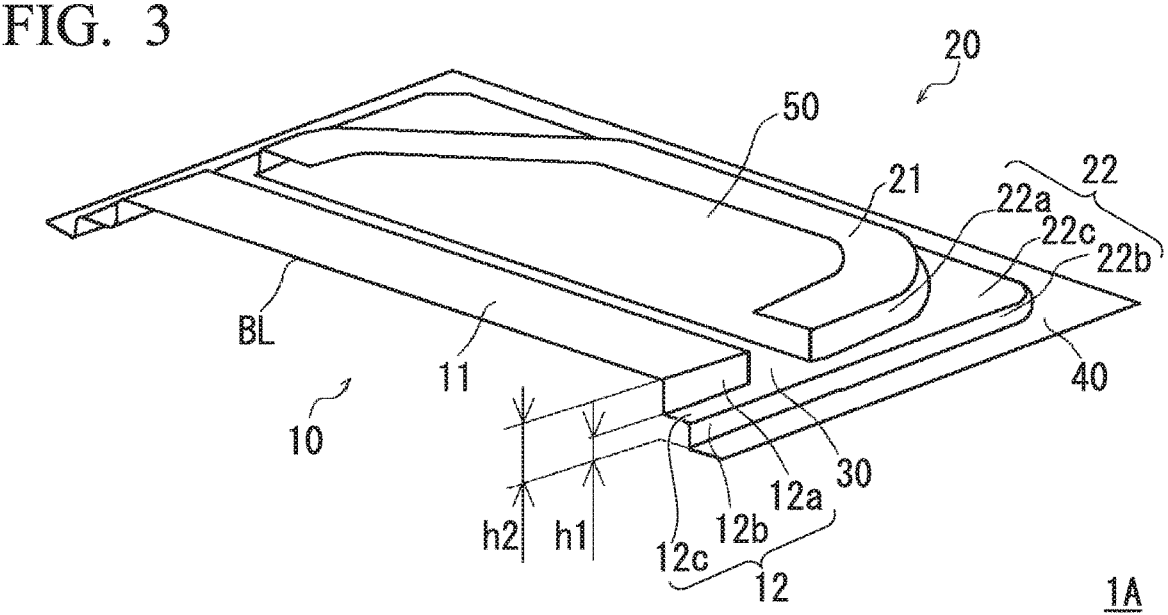
FIG. 3 is a perspective view of a door inner panel according to a first modification example seen from an inside of a car.

FIG. 3 is a perspective view of a door inner panel 1A according to a first modification example seen from an inside of a car.

The door inner panel 1A is different from the door inner panel 1 according to the first embodiment in terms of the fact that both ends of the flat sheet portion 30 are connected to the first level difference portion 12c and the second level difference portion 22c.

That is, in the door inner panel 1A, both ends of the flat sheet portion 30 are provided so as to be integrated with the first level difference portion 12c and the second level difference portion 22c.

The first panel portion 10 is connected with the second panel portion 20 through the flange portion 40 and the level difference portions (the first level difference portions 12c and the second level difference portion 22c). Therefore, in the door inner panel 1A, compared with the door inner panel 1 according to the first embodiment, a region in which the first panel portion 10 is connected with the second panel portion 20 is larger. Therefore, the door inner panel 1A has a higher stiffness than the door inner panel 1 according to the above-described embodiment.

However, the flat sheet portion 30 of the door inner panel 1A is disposed at a location farther than the door outer panel than the flat sheet portion 30 of the door inner panel 1 according to the above-described embodiment. Therefore, the door inner panel 1 according to the above-described embodiment is preferred from the viewpoint of the impact characteristics of the door. In summary, the disposition of the flat sheet portion 30 is appropriately set in consideration of the impact characteristics of doors, the stiffness of the door inner panel, and the like.

h1 shown in FIG. 3 represents a height in the pressing direction from the flange portion 40 to the level difference portions (the first level difference portion 12c and the second level difference portion 22c).

h2 represents a height in the pressing direction from the flange portion 40 to the top sheet portions (the first top sheet portion 11 and the second top sheet portion 21).

The door inner panel 1A according to this modification example preferably satisfies conditions of h2≥40 mm and h1/h2<0.8. This is because, in the case of h2<40 mm, the space SP that stores a window and the like is too small. In the case of h1/h2≥0.8, the distance between the level difference portions (the first level difference portion 12c and the second level difference portion 22c) and the top sheet portion (the first top sheet portion 11 and the second top sheet portion 21) is close, and thus the sealing property of the inside of the car becomes poor.

Second Modification Example

Figure 4:
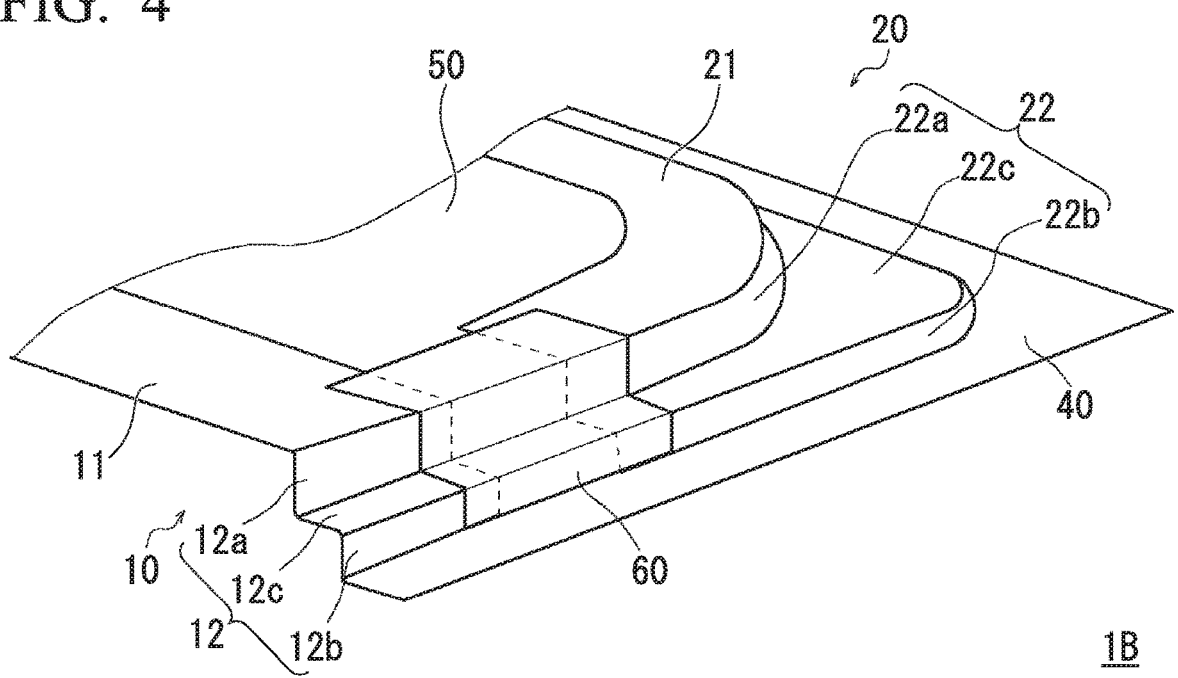
FIG. 4 is a perspective view showing a part of a door inner panel according to a second modification example.

FIG. 4 is a perspective view showing a door inner panel 1B according to a second modification example. In the door inner panel 1B, a reinforcement component 60 connecting the first panel portion 10 and the second panel portion 20 is provided in order to enhance the stiffness.

As shown in FIG. 4, the reinforcement component 60 is a member that connects the first level difference portion 12c and the second level difference portion 22c of the first standing wall portion 12 and the second standing wall portion 22. Therefore, the first panel portion 10 is connected to the second panel portion 20, and the stiffness of the entire door inner panel 1B enhances. The reinforcement component 60 is, for example, a sheet-like component obtained by pressing a steel sheet. The reinforcement component 60 may be joined to the first panel portion 10 and the second panel portion 20 by means of, for example, welding.

Third Modification Example

Figure 5A:
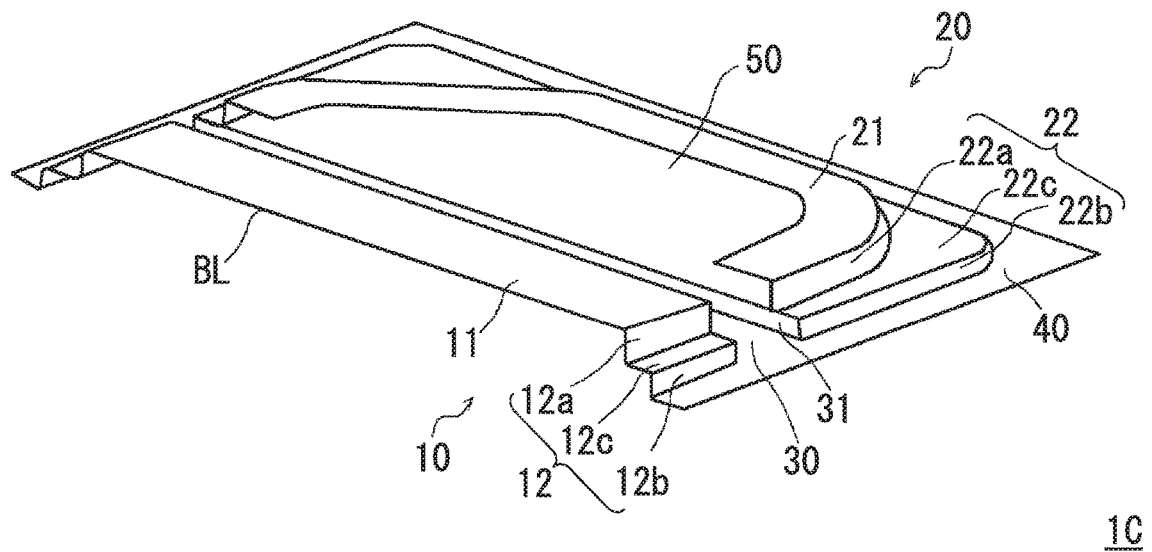
FIG. 5A is a perspective view of a door inner panel according to a third modification example seen from an inside of a car.
Figure 5B:
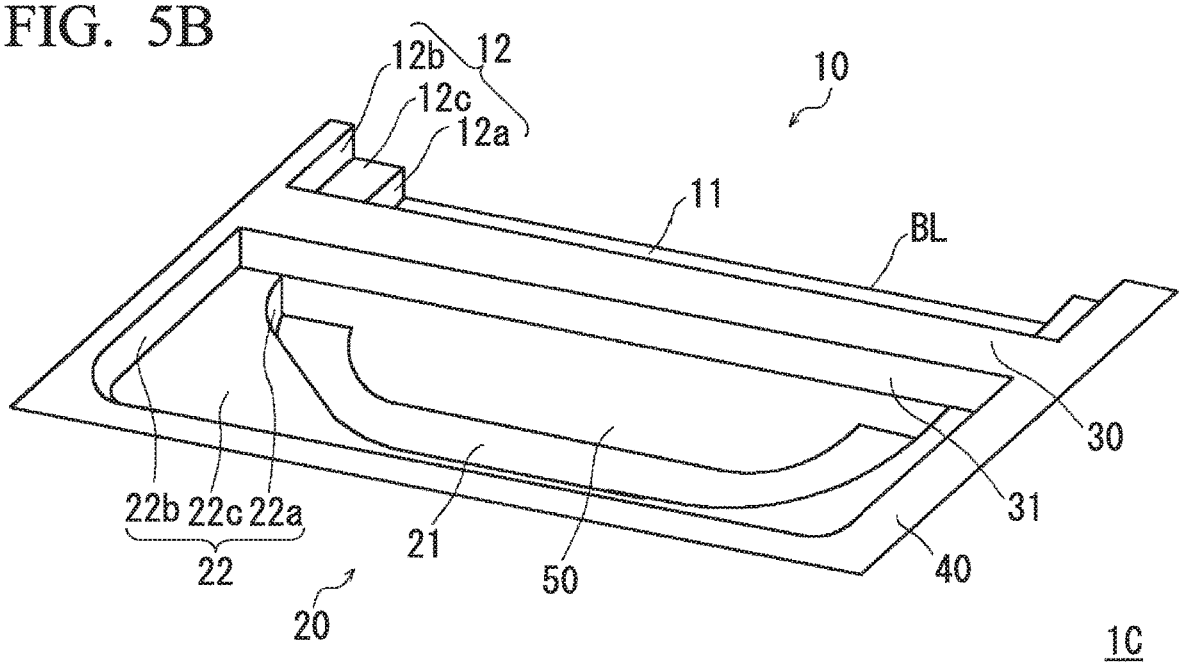
FIG. 5B is a perspective view of the door inner panel according to the third modification example seen from an outside of the car.

FIG. 5A and FIG. 5B show a door inner panel 1C according to a third modification example.

FIG. 5A is a perspective view of the door inner panel 1C seen from an inside of a car, and FIG. 5B is a perspective view of the door inner panel 1C seen from an outside of the car.

The door inner panel 1C according to this third modification example is different from the door inner panel 1 according to the first embodiment in terms of the fact that the flat sheet portion 30 has a wall portion 31. The other constitutions of the door inner panel 1C according to this modification example are the same as those of the door inner panel 1 according to the above-described embodiment.

In the door inner panel 1C, the flat sheet portion 30 has the wall portion 31, and thus the cross-sectional shape of the flat sheet portion 30 is a U-like shape. Therefore, compared with the flat sheet portion 30 of the door inner panel 1 according to the above-described embodiment which has a flat shape, the flat sheet portion 30 has an increased cross-sectional secondary moment. That is, the impact energy being absorbed by the flat sheet portion 30 having the wall portion 31 is greater than the impact energy being absorbed by the flat sheet portion 30 of the door inner panel 1 according to the above-described embodiment. In addition, the wall portion 31 connects the first standing wall portion 12 and the second standing wall portion 22. Therefore, it is possible to increase the stiffness of the entire door inner panel 1C.

Second Embodiment

Hereinafter, a method for manufacturing a door inner panel according to a second embodiment of the present invention will be described with reference to FIG. 6A to FIG. 11.

The method for manufacturing a door inner panel according to the present embodiment is a method of press-forming the door inner panel 1 according to the first embodiment and includes a step of preparing the steel sheet S as a blank material (blank preparation step) and a step of pressing the steel sheet S in a cold or hot manner using a pressing apparatus (press working step).

Figure 6A:
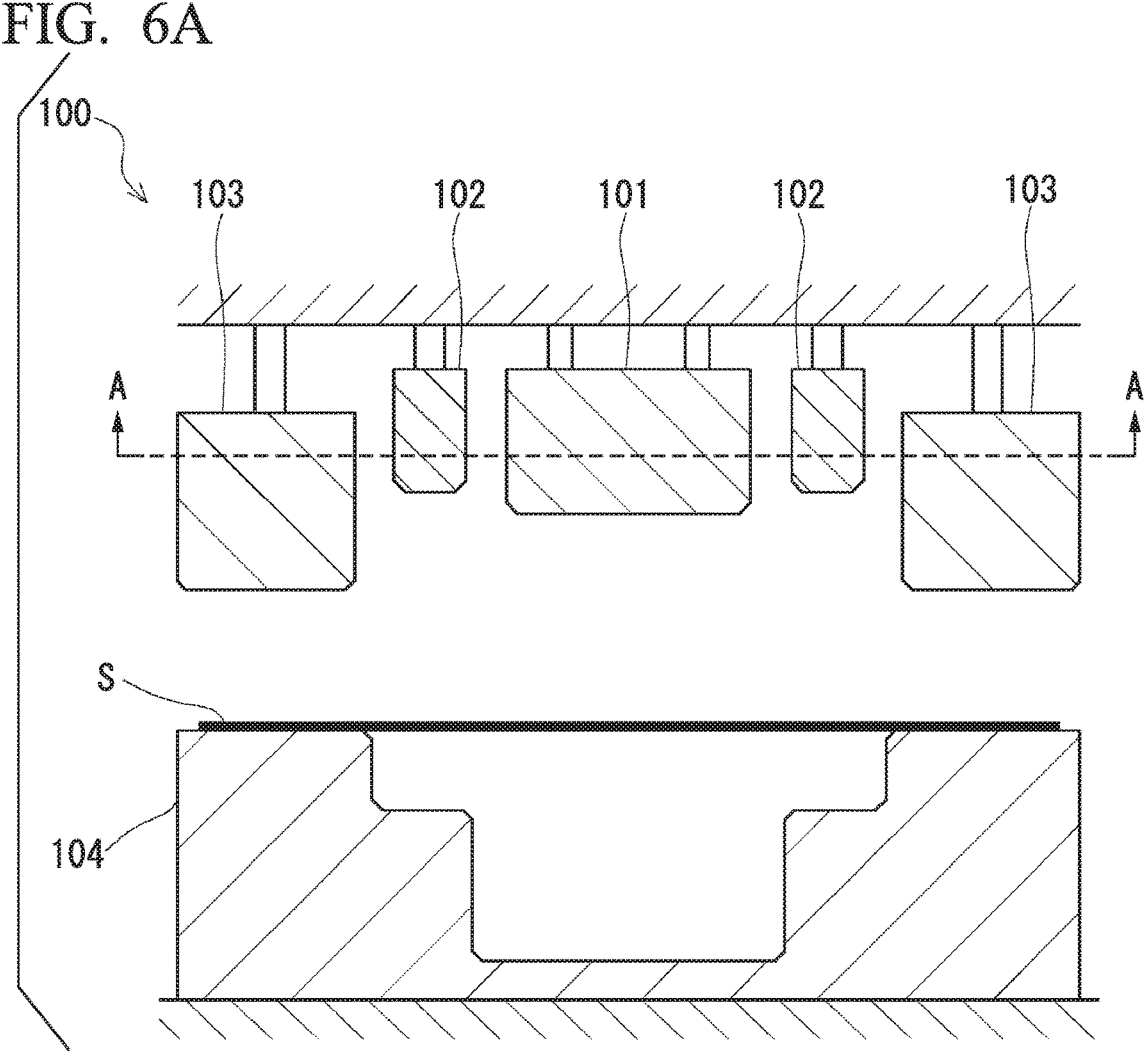
FIG. 6A is a cross-sectional view schematically showing an example of a pressing apparatus that is used in a method for manufacturing a door inner panel according to a second embodiment of the present invention.
Figure 6B:
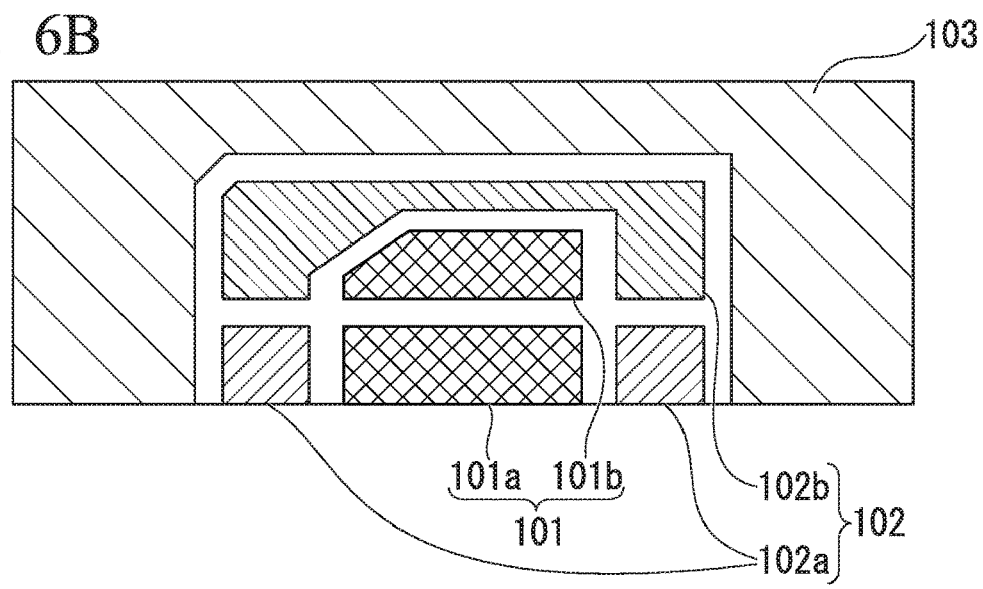
FIG. 6B is a view in an A-A arrow direction in FIG. 6A.

FIG. 6A and FIG. 6B are cross-sectional views schematically showing a pressing apparatus 100 that is used in the press working step of the method for manufacturing a door inner panel according to the present embodiment.

FIG. 6A is a cross-sectional view showing a place corresponding to the first panel portion 10 of the door inner panel 1 in the pressing apparatus 100, and FIG. 6B is a view in an A-A arrow direction in FIG. 6A.

As shown in FIG. 6A and FIG. 6B, the pressing apparatus 100 includes an inside punch 101, an outside punch 102, a blank holder 103, and a die 104. In the pressing apparatus 100, the inside punch 101 and the outside punch 102 are pressed into a dent of the die 104 in a state in which the steel sheet S is sandwiched and fixed by the blank holder 103 and the die 104, whereby the steel sheet S can be formed to a shape of the door inner panel 1 shown in FIG. 1.

The inside punch 101 has a first inside punch 101a having a shape corresponding to that of the first top sheet portion 11 and a second inside punch 101b having a shape corresponding to that of the second top sheet portion 21.

As shown in FIG. 6B, in the inside punch 101 of the pressing apparatus 100, the first inside punch 101a and the second inside punch 101b are separated from each other along a portion corresponding to the flat sheet portion. When the inside punch 101 as described is used, it is possible to set the press forming depth of the portion corresponding to the flat sheet portion 30 to be shallower than the press forming depth of a portion corresponding to the first top sheet portion 11 and the second top sheet portion 21.

However, the first inside punch 101a and the second inside punch 101b do not need to be completely separated from each other, and only the place corresponding to the flat sheet portion 30 may be formed in a groove shape in a single inside punch 101.

The outside punch 102 is disposed outside the inside punch 101 and has a first outside punch 102a having a shape corresponding to that of the first level difference portion 12c and a second outside punch 102b having a shape corresponding to that of the second level difference portion 22c.

As shown in FIG. 6B, in the pressing apparatus 100, the first outside punch 102a and the second outside punch 102b are separated from each other along the portion corresponding to the flat sheet portion 30, whereby it is possible to set the press forming depth of the portion corresponding to the flat sheet portion 30 to be shallower than the press forming depth of a portion corresponding to the first level difference portion 12c and the second level difference portion 22c.

However, the first outside punch 102a and the second outside punch 102b do not need to be completely separated from each other, and only the place corresponding to the flat sheet portion 30 may be formed in a groove shape in a single inside punch 101.

Furthermore, in the case of press-forming the door inner panel 1A according to the first modification example, it is preferable to use the outside punch in which the first outside punch 102a and the second outside punch 102b are not separated from each other.

The blank holder 103 is disposed outside the outside punch 102 so as to face the die 104 in a pressing axis direction. When sandwiched between the blank holder 103 and the die 104, the steel sheet S can be fixed during press forming.

In the blank holder 103, the shape of the flange portion 40 of the door inner panel 1 is formed.

The die 104 is disposed so as to face the inside punch 101, the outside punch 102, and the blank holder 103 in the pressing axis direction, and a dent having a shape corresponding to that of the door inner panel 1 is formed.

In the case of press-forming the steel sheet S in a hot manner, the steel sheet is preferably formed by hot stamping in which the steel sheet S in a state of being heated is press-formed in a die and cooled in the die. Therefore, the pressing apparatus 100 may include a heating device and a cooling device.

Furthermore, in the case of carrying out hot stamping, in order to obtain a favorable quenching effect, it is preferable to press-form the steel sheet S heated to the Ac 3 point or higher.

Next, the step of preparing the steel sheet S (blank preparation step) will be described.

The characteristics of the steel sheet S being prepared are as described in the first embodiment and preferably selectively used depending on the case of hot pressing and the case of cold pressing.

Figure 7:
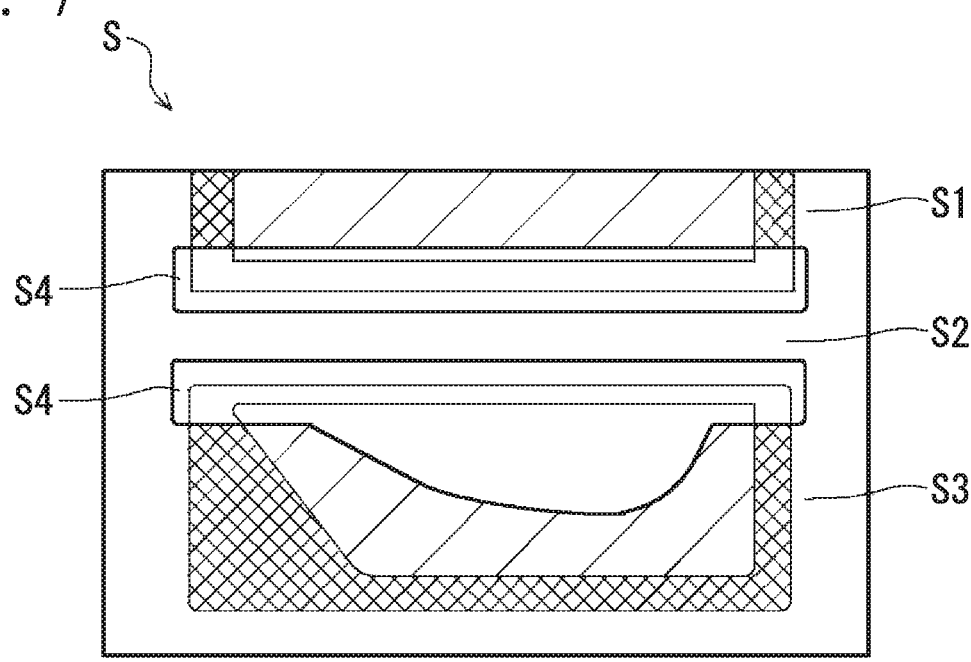
FIG. 7 is a plan view of a blank material that is used in the method for manufacturing a door inner panel according to the above-described embodiment.

FIG. 7 is a plan view of the steel sheet S in the case of manufacturing the door inner panel 1 shown in FIG. 1A and FIG. 1B. The steel sheet S has a first flat sheet portion S1, a second flat sheet portion S2, a third flat sheet portion S3, and opening portions S4.

The first flat sheet portion S1 is a portion corresponding to the first panel portion 10. The second flat sheet portion S2 is a portion corresponding to the second panel portion 20. The third flat sheet portion S3 is a portion corresponding to the flat sheet portion 30. The opening portions S4 are portions corresponding to the opening portion 50.

A region indicated by hatched lines in FIG. 7 is a region corresponding to the inside punch 101. A region indicated by crossing hatched lines in FIG. 7 is a region corresponding to the outside punch 102.

As shown in FIG. 7, the opening portions S4 are provided between the first flat sheet portion S1 and the third flat sheet portion S3 and between the second flat sheet portion S2 and the third flat sheet portion S3. As described above, in a case in which the steel sheet S has the opening portions S4, stretch flange deformation is easy. However, in a case in which the steel sheet S can be formed even when the steel sheet S does not have the opening portion S4, the opening portions S4 are not necessary.

However, even in this case, it is preferable to provide cut lines that separate the steel sheet S into the first flat sheet portion S1, the second flat sheet portion S2, and the third flat sheet portion S3.

The steel sheet having the above-described shape is obtained by punching the steel sheet.

In the case of cold forming, the door inner panel 1 shown in FIG. 1A and FIG. 1B can be formed as long as the steel sheet has ductility and a stretch flange property that materials having a tensile strength of approximately 340 to 980 MPa have.

Figure 8:
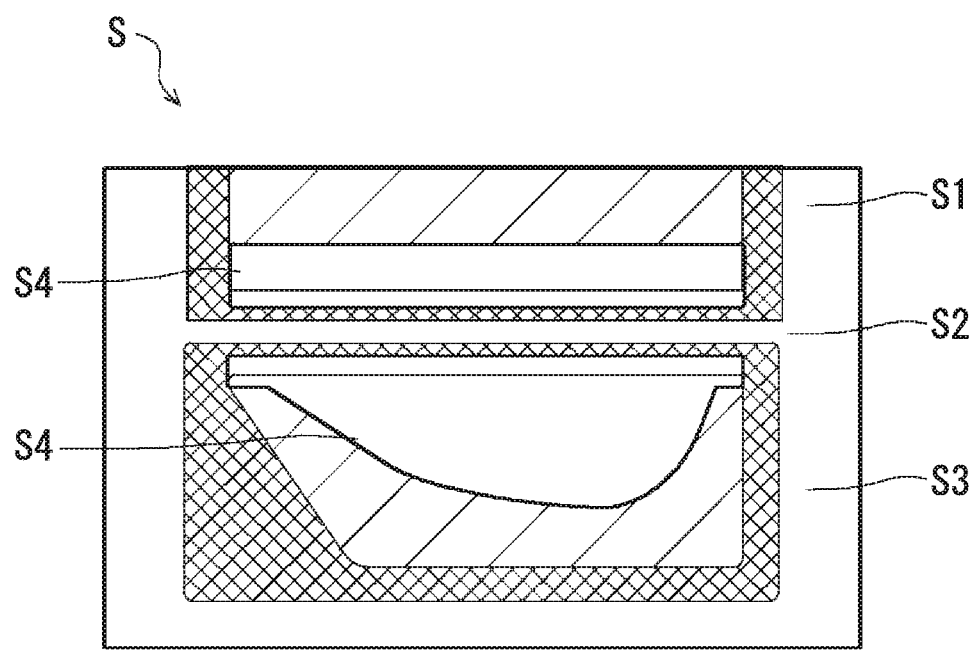
FIG. 8 is a plan view of a blank material in the case of manufacturing the door inner panel according to the third modification example.

Meanwhile, in the case of press-forming the door inner panel 1C according to the third modification example shown in FIG. 5A and FIG. 5B, the flat sheet portion 30 has the wall portion 31, and thus a steel sheet S shown in FIG. 8 is preferably used.

In the steel sheet S shown in FIG. 8, the inside punch 101 and the outside punch 102 further work a part of the third flat sheet portion S3 of the steel sheet S. Therefore, the wall portion 31 of the flat sheet portion 30 is formed.

A region indicated by hatched lines in FIG. 8 is a region corresponding to the inside punch 101. A region indicated by crossing hatched lines in FIG. 8 is a region corresponding to the outside punch 102.

Next, the press working step will be described.

In the press working step, press working is carried out in a cold or hot manner on the first flat sheet portion S1 and the second flat sheet portion S2 of the steel sheet S using the above-described pressing apparatus 100. Therefore, the steel sheet S is formed to the door inner panel 1. In more detail, the inside punch 101 is configured to work a region in the first flat sheet portion S1 of the steel sheet S which is formed to the first top sheet portion 11 and a region in the second flat sheet portion S2 of the steel sheet S which is formed to the second top sheet portion 21, and the outside punch 102 is configured to work a region in the first flat sheet portion S1 of the steel sheet S which is formed to the first level difference portion 12c and a region in the second flat sheet portion S2 of the steel sheet S which is formed to the second level difference portion 22c.

In the case of carrying out the press working step in a hot manner, it is preferable to carry out hot stamping in which the steel sheet S heated to the Ac3 point or higher is pressed and, simultaneously, the formed door inner panel is quenched.

In the case of carrying out the press working step in a hot manner, the steel sheet S is heated before the press working. The steel sheet S is heated using a heating device not shown. The steel sheet S needs to be heated to the A1 point or higher of the material thereof, but preferably heated to the Ac3 point or higher in order to more reliably obtain the quenching effect.

When the steel sheet S is heated to the A1 point or higher, the metallographic structure of the quenched door inner panel becomes martensite, and the strength increases.

The heating temperature is, for example, 700° C. to 900° C. The heating temperature is appropriately set depending on the material, the forming difficulty, and the like. In the hot stamping, the steel sheet S is heated and softened, and thus it is possible to form the steel sheet to a complicated shape.

In the press working step, the working of the steel sheet S by the outside punch 102 is completed earlier than the working of the steel sheet S by the inside punch 101. Therefore, it is possible to suppress the generation of forming defects such as cracks or wrinkles in the formed door inner panel.

Figure 9A:
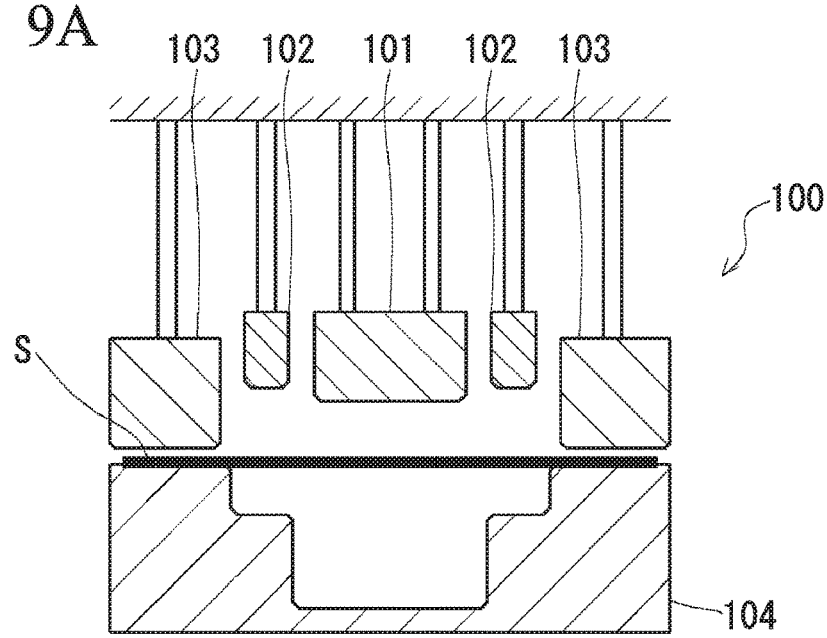
FIG. 9A is a cross-sectional view showing a stage of sandwiching the blank material with a blank holder in a press working step.
Figure 9B:
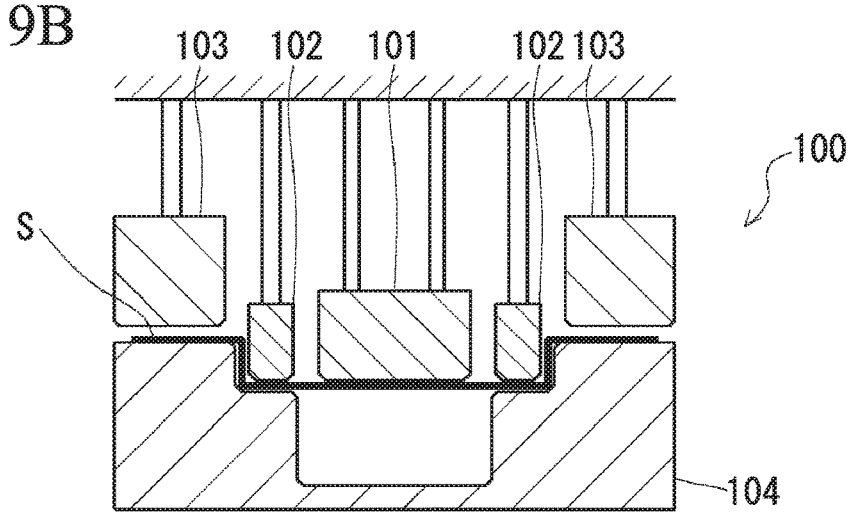
FIG. 9B is a cross-sectional view showing a state in which pressing by an outside punch is completed in the press working step.
Figure 9C:
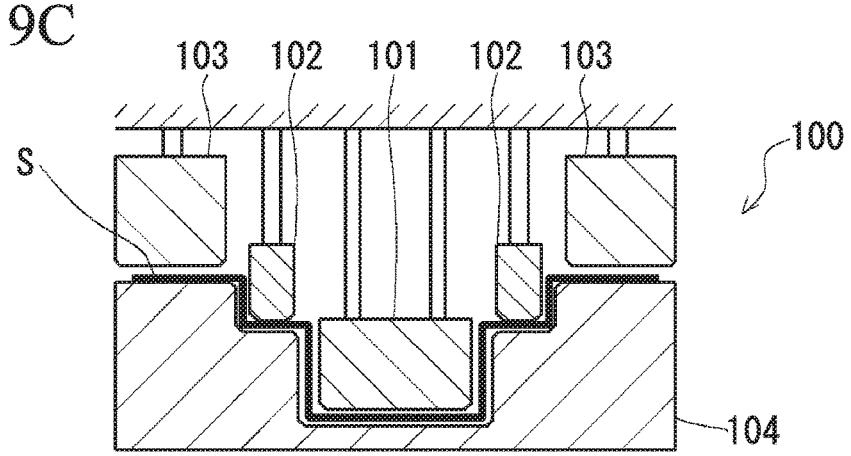
FIG. 9C is a cross-sectional view showing a state in which pressing by an inside punch is completed in the press working step.

FIG. 9A to FIG. 9C are cross-sectional views schematically showing the press working step of the method for manufacturing a door inner panel according to the present embodiment.

FIG. 9A shows a stage of holding the steel sheet S placed on the die 104 using the blank holder 103 (initial stage).

FIG. 9B shows a state in which the holding by the outside punch 102 is completed (middle stage).

FIG. 9C shows a state in which the holding by the inside punch 101 is completed (final stage)

In the initial stage shown in FIG. 9A, the steel sheet S is placed on the die 104. In this state, a slide of the pressing apparatus, which is not shown, moves down. Therefore, the steel sheet S is sandwiched by the blank holder 103 and the die 104.

In the case of carrying out press working in a hot manner, in the initial stage shown in FIG. 9A, the interval between the blank holder 103 and the die 104 is preferably larger than the thickness of the steel sheet S. That is, a gap is provided between the steel sheet S and the blank holder 103. The size of the gap is, for example, 0.1 mm. In a case in which the steel sheet S is brought into contact with the blank holder 103, a portion of the steel sheet S which comes into contact with the blank holder 103 is cooled before the press forming of the steel sheet S. Therefore, the cooling rate of the steel sheet S partially differs, and thus the strength of a formed article is not uniform throughout. Therefore, it is preferable to provide a small gap between the blank holder 103 and the steel sheet S.

In the middle stage shown in FIG. 9B, the pressing by the outside punch 102 is completed, and the steel sheet S is in a state of being draw-formed by the outside punch 102 and the die 104. At this time, the inside punch 101 is as high as the outside punch 102.

In the method for manufacturing a door inner panel according to the present embodiment, the pressing of the steel sheet S by the inside punch 101 begins as soon as the pressing of the steel sheet S by the outside punch 102 is completed.

In the final stage shown in FIG. 9C, a state in which the pressing of the steel sheet S by the inside punch 101 which was begun from the state shown in FIG. 9B is completed is formed.

In the method for manufacturing a door inner panel according to the above-described embodiment, when the pressing of the steel sheet S by the outside punch 102 is completed, the height location of the inside punch 101 is as high as the height of the outside punch 102. However, the height location of the inside punch 101 at this time may be at a lower location than the outside punch 102.

Figure 10A:
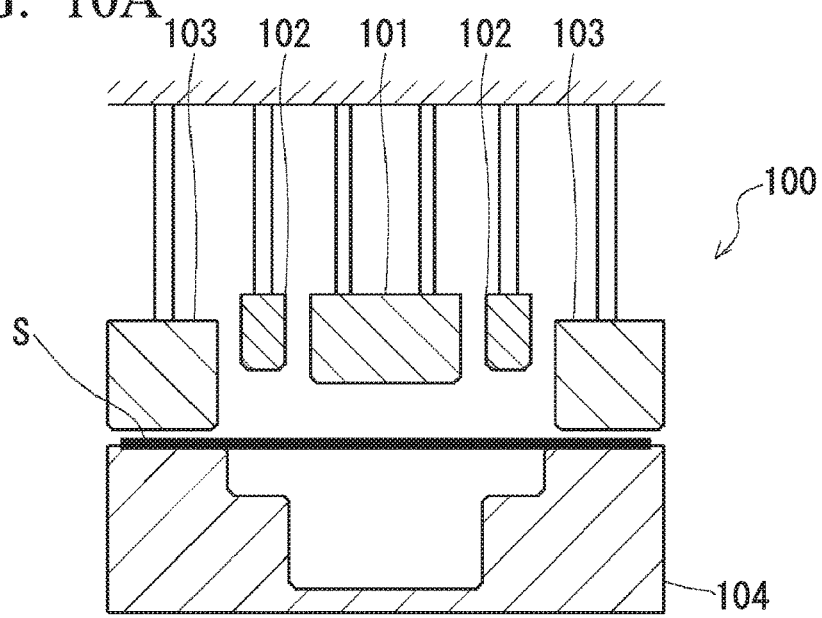
FIG. 10A is a cross-sectional view showing a stage of sandwiching the blank material with the blank holder in the press working step.
Figure 10B:
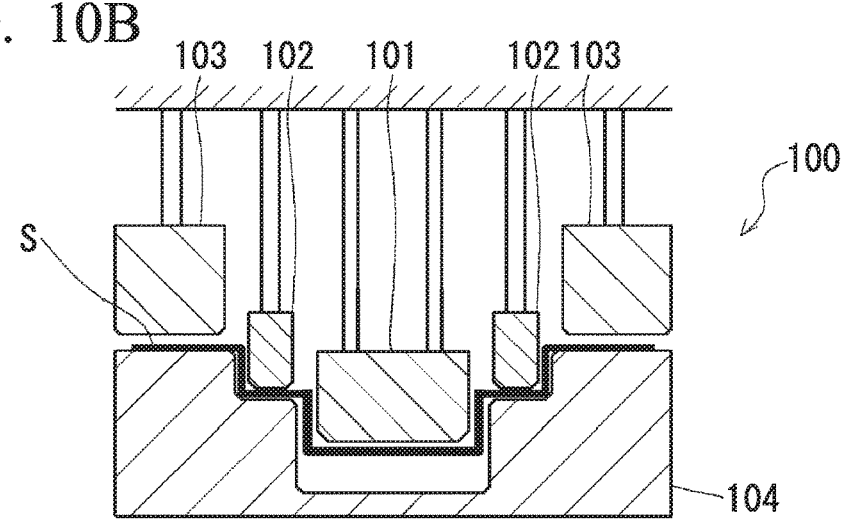
FIG. 10B is a cross-sectional view showing a state in which pressing by the outside punch is completed after pressing by the inside punch begins in the press working step.
Figure 10C:
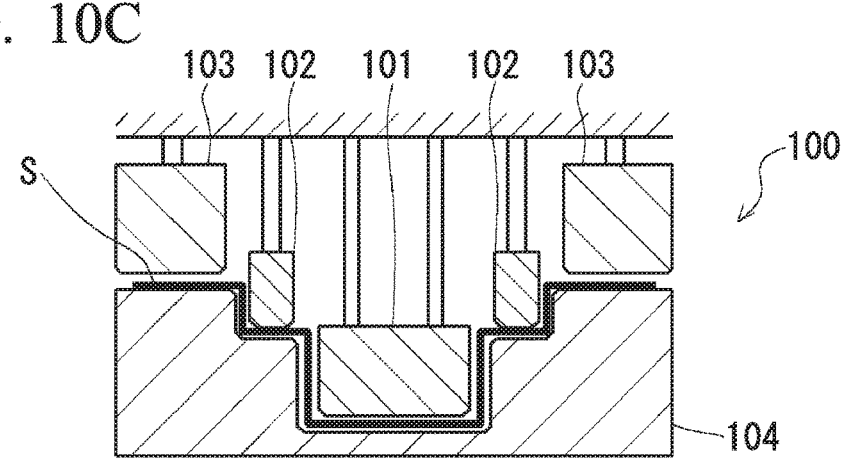
FIG. 10C is a cross-sectional view showing a state in which pressing by the inside punch is completed in the press working step.

That is, as shown in FIG. 10A to FIG. 10C, the pressing of the steel sheet S by the inside punch 101 may begin before the pressing of the steel sheet S by the outside punch 102 is completed.

In addition, when the pressing of the steel sheet S by the outside punch 102 is completed, the height location of the inside punch 101 may be at a lower location than the outside punch 102. That is, the pressing of the steel sheet S by the inside punch 101 may begin after the pressing of the steel sheet S by the outside punch 102 is completed.

In any case, the pressing by the inside punch 101 is not completed earlier before the pressing by the outside punch 102. Meanwhile, the steel sheet S simply needs to be held by the blank holder 103 and the die 104 until the forming by the outside punch is completed.

FIG. 9A to FIG. 9C and FIG. 10A to FIG. 10C show cases in which the steel sheet S does not have any opening portions; however, in a case in which the steel sheet S has an opening portion, after the completion of the pressing by the outside punch 102, the material moves from the top sheet portion to the vertical wall in the middle of the forming by the inside punch 101 and stretch-flange-deforms, and thus it becomes possible to further suppress cracks.

According to the method for manufacturing a door inner panel according to the present embodiment, the pressing of the steel sheet S by the outside punch 102 is completed, and then the pressing of the steel sheet S by the inside punch 101 is completed. Therefore, when the pressing by the outside punch 102 is completed, and thus the steel sheet S is draw-formed, a portion of the steel sheet S pressed by the outside punch 102 is restrained by the outside punch 102. Therefore, it is possible to suppress wrinkles and the like being generated in the vicinity of the level difference portion of the door inner panel. Hereinafter, this fact will be described below.

Figure 11:
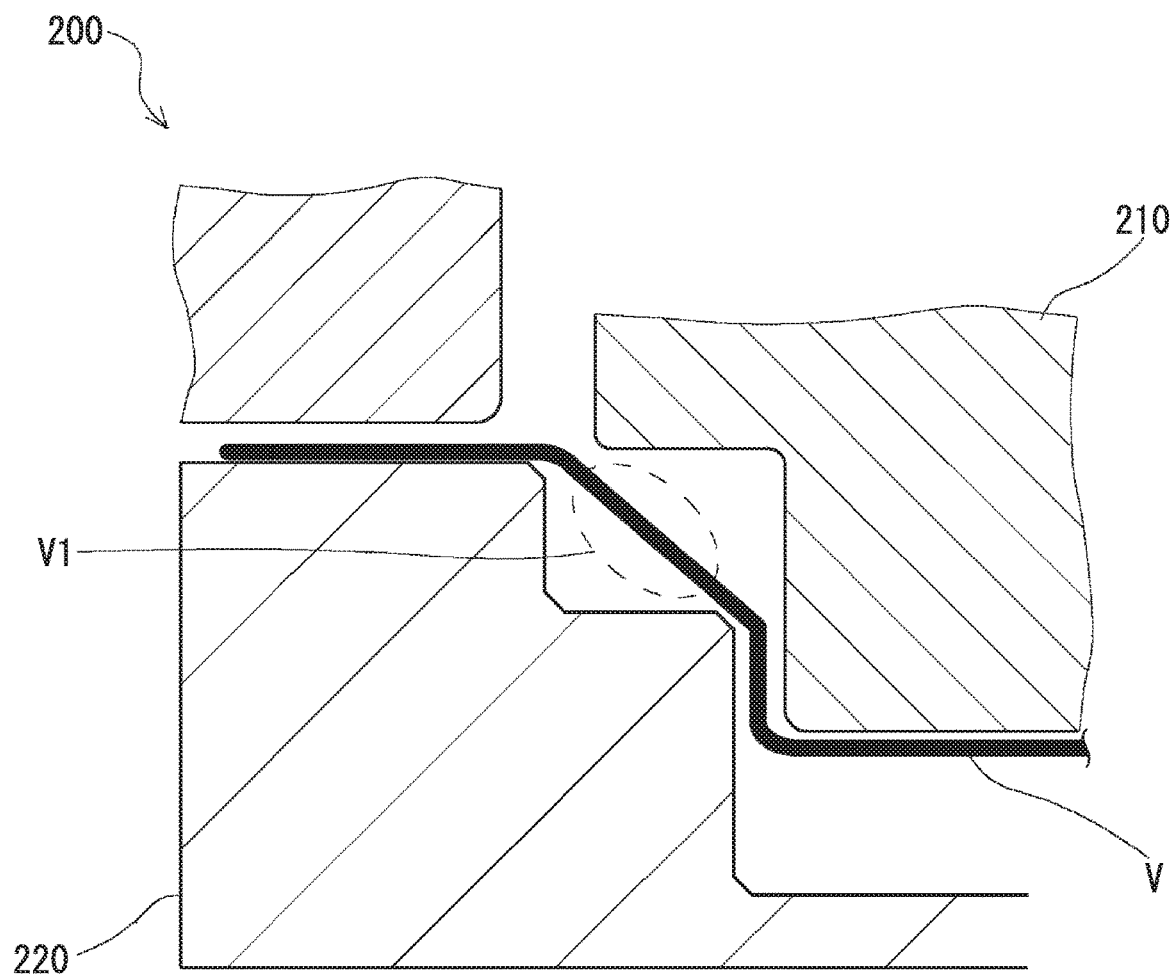
FIG. 11 is a cross-sectional view showing a state in the middle of press working using an ordinary pressing apparatus.

FIG. 11 is a cross-sectional view showing a state in the middle of press working using an ordinary pressing apparatus 200. FIG. 11 shows a part of a die 220 of the ordinary pressing apparatus 200 in an enlarged manner. In the pressing apparatus 200, the punch 210 is not separated into an inside punch and an outside punch. Therefore, when a punch 210 is moved down, a portion V1 of a steel sheet V is not restrained by the punch 210 and the die 220. That is, the portion V1 of the steel sheet V does not come into contact with the punch 210 and the die 220.

In the case of cold press working, in the stage in the middle of the press working shown in FIG. 11, the portion V1 of the steel sheet V is not restrained by the punch 210 and the die 220. Therefore, the portion V1 of the steel sheet V is likely to warp and wrinkle.

On the other hand, in the case of hot press working, the steel sheet is cooled by the contact between the steel sheet and the punch, the die, or the like. Therefore, in the stage in the middle of the press working shown in FIG. 11, the portion V1 of the steel sheet V is not cooled. The portion V1 of the steel sheet V is cooled when the punch 210 is further pressed down from the location shown in FIG. 11. In summary, in the case of forming a door inner panel provided with a level difference portion in a standing wall portion using the punch 210 in which the shapes of a top sheet portion and the level difference portion of the door inner panel are integrally formed, the portion V1 of the steel sheet V is cooled later than the other portions.

When the cooling of the steel sheet V is partially delayed, there is a case in which the strength and ductility of the steel sheet V partially differ. In this case, cracks, wrinkles, and the like are likely to be generated in a door inner panel to be formed.

As shown in FIG. 1A and FIG. 1B, in a case in which the first standing wall portion 12 and the second standing wall portion 22 of the door inner panel 1 have the level difference portions 12c and 22c, particularly, cracks, wrinkles, and the like are likely to be generated. In a case in which the door inner panel has a high strength after forming, cracks, wrinkles, and the like are more likely to be generated.

In the method for manufacturing a door inner panel according to the present embodiment, as shown in FIG. 9A to FIG. 9C, the pressing apparatus 100 having the inside punch 101 and the outside punch 102 is used. Therefore, the first top sheet portion 11 (of the second top sheet portion 21) and the first level difference portion 12c (or the second level difference portion 22c) of the door inner panel 1 as shown in FIG. 1A and FIG. 1B are formed using separate punches.

Additionally, the pressing by the outside punch 102 is completed earlier than the pressing by the inside punch 101. Therefore, when one punch forms the top sheet portion, the other punch pressed the level difference portion of the door inner panel 1. Therefore, in the forming of the top sheet portion, the area of a portion of the steel sheet S which is not restrained becomes small, and it is possible to suppress the generation of wrinkles and the like in the door inner panel 1.

Hitherto, the embodiments of the present invention have been described. However, the above-described embodiments are simply examples for carrying out the present invention. Therefore, the present invention is not limited to the above-described embodiment, and the above-described embodiments can be carried out after being appropriately modified within the scope of the gist of the present invention.

For example, in the above description, the door inner panels for a car side door have been described. However, the door inner panel of the present embodiment is not limited to panels for a side door. The door inner panel of the present embodiment can also be applied to doors other than side doors such as rear doors. In addition, the door inner panel of the present embodiment is not limited to panels for a car. The door inner panel can be applied to products for which excellent impact characteristics are demanded. Examples of such products include cars, construction machinery, aircrafts, and the like.

In the above-described embodiment, a case in which the material of the door inner panel is a steel sheet has been described. However, the material of the door inner panel is not limited to steel sheets, and a metal sheet may be used. Examples of the metal sheet include an aluminum sheet, an aluminum alloy sheet, a multilayer steel sheet, a magnesium sheet, and the like. In addition, a tailored blank may be used as the steel sheet. Tailored blanks are roughly classified into tailor welded blanks (hereinafter, also referred to as "TWB") and tailor rolled blanks (hereinafter, also referred to as "TRB"). TWB is obtained by integrating a plurality of steel sheets having different sheet thicknesses, different tensile strengths, and the like by means of welding (for example, butt welding). On the other hand, TRB has a sheet thickness that is changed by changing the interval between rolling rolls during the manufacturing of a steel sheet. The use of this tailored blank enables an increase in the strength only in necessary places, and thus it is also possible to reduce the sheet thickness. In addition, door inner panels for which the tailored blank is used can also be applied to cars. Therefore, the impact characteristics of door inner panels can be improved, and furthermore, the weight reduction can be desired.

Figure 12:
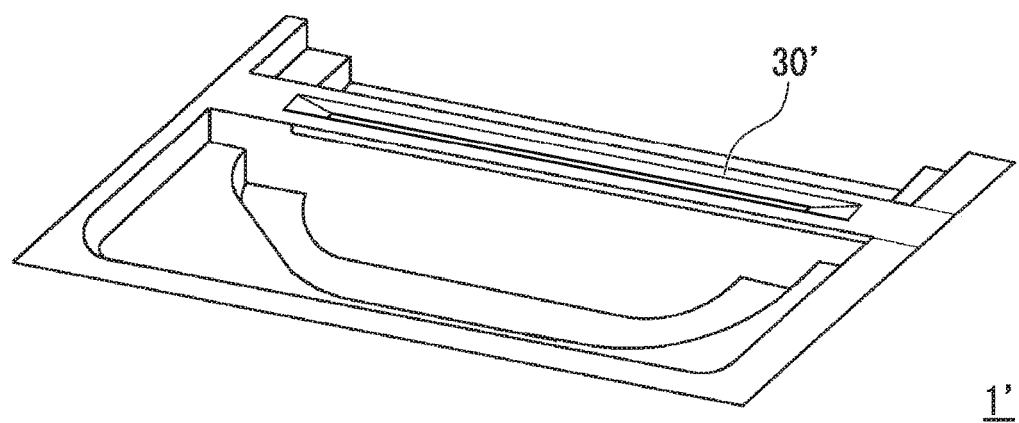
FIG. 12 is a perspective view showing the door inner panel in the case of imparting a protrusion shape to a flat sheet portion.

In the above-described embodiment, the flat sheet portion 30 is formed to a flat band shape (linear shape), but the flat sheet portion 30 may be formed by being bent in a planar view and a recessed portion or a protruded portion may be formed. As an example, FIG. 12 shows an example of a door inner panel 1' having a flat sheet portion 30' in which a recessed portion is formed. In this case, it is possible to enhance the cross-sectional secondary moment of the flat sheet portion 30 and improve the strength of the door inner panel 1. In addition, both a recessed portion and a protruded portion may be formed.

In the above-described embodiment, the flat sheet portion 30 extends parallel to the belt line BL in a planar view, but the flat sheet portion 30 may not extend parallel to the belt line BL. That is, the flat sheet portion 30 may have an angle with respect to the belt line BL.

In the above-described embodiment, the second standing wall portion 22 which bends and extends from the four outside sidelines 21a, 21b, 21c, and 21d of the second top sheet portion 21 is provided, but the second standing wall portion 22 may be bend and extend from each of two or more adjacent sidelines out of the outside sidelines of the second top sheet portion 21.

In the above-described embodiment, the planar shape of the first top sheet portion 11 is a quadrilateral shape, and the planar shape of the second top sheet portion 21 is a pentagonal shape. However, the planar shapes of the first top sheet portion 11 and the second top sheet portion 21 may be appropriately set depending on the shape of a car.

In the above-described embodiment, the opening portion 50 is provided only at one place in the second top sheet portion 21, but the number of the opening portions 50 is not limited to one, and a plurality of opening portions 50 may be formed in the second top sheet portion 21. In addition, the opening portion 50 may also be formed in the first top sheet portion 11. The shape of the opening portion 50 may be a circular shape, an elliptical shape, a polygonal shape, or the like and is not particularly limited. In addition, the opening portion 50 may not be formed in the second top sheet portion 21. In a case in which the second top sheet portion 21 can be formed without the opening portion 50 or a speaker and the like are not required, the opening portion 50 is not necessary.

In the above-described embodiment, a case in which the first standing wall portion 12 and the second standing wall portion 22 extend perpendicularly to the first top sheet portion 11 and the second top sheet portion 21 has been described, but the standing wall portions may not be strictly perpendicular to the top sheet portions.

In addition, in the above-described embodiment, a case in which the surfaces of the first level difference portion 12c and the second level difference portion 22c are parallel to the first top sheet portion 11 and the second top sheet portion 21 has been described, but the surfaces may not be strictly parallel to the top sheet portions.

In the above-described embodiment, a case in which the four adjacent outside second standing wall portions 22 of the second standing wall portion 22 have the level difference portions (the first level difference portion 12c and the second level difference portion 22c) has been described. That is, a case in which there are three sets of the adjacent second standing wall portions 22, and these three sets all have the level difference portions (the first level difference portion 12c and the second level difference portion 22c) has been described, but the number of sets is not limited to three.

In the above-described embodiment, a case in which the number of levels in the level difference portion is one has been described, but a plurality of levels may be provided.

EXAMPLE

As a blank, steel sheets A to F shown in Table 1 were prepared. "TS after HS" in Table 1 refers to a tensile strength in a case in which the steel sheet was press-formed in a state of being heated to the Ac3 point or higher and cooled in a die.

thereby obtaining the absorption energy (J) with an impact dislocation of 100 mm. In addition, a value obtained by dividing the absorption energy by the weight of the door inner panel including a reinforcement portion or a reinforcement member was considered as the weight efficiency.

Furthermore, in Table 2, the weight efficiency ratio (%) computed from 100×K1/K2 in a case in which the weight efficiency of the door inner panel into which the reinforcement member was united is represented by K1 and the weight efficiency of the door inner panel into which the reinforcement member was separately attached is represented by K2.

TABLE 2

| | | | Weight efficiency K of absorption energy with impactor dislocation of 100 mm (J/g) | | |
|---|---|---|---|---|---|
| Test No. | Hot/ cold | Blank | Reinforcement member-united (Invention Example) (K1) | Reinforcement member-separately attached (Comparative Example) (K2) | Weight efficiency ratio (100 × K1/K2) |
| 1 | Hot | Steel sheet A | 0.1 | 0.07 | 142.8% |
| 2 | Cold | Steel sheet B | 0.08 | 0.058 | 137.9% |
| 3 | Cold | Steel sheet C | 0.06 | 0.042 | 142.9% |
| 4 | Cold | Steel sheet D | 0.05 | 0.035 | 142.9% |
| 5 | Cold | Steel sheet E | 0.038 | 0.034 | 111.8% |
| 6 | Cold | Steel sheet F | 0.030 | 0.028 | 107.1% |

Table 2 shows that, according to the present invention examples, compared with the cases in which the reinforcement member was separately attached to the door inner panel, it becomes possible to increase the absorption energy per unit weight by maintaining the operation efficiency.

INDUSTRIAL APPLICABILITY

According to the present invention, it is possible to provide a lightweight door inner panel being excellent in

TABLE 1

| | Components of steel sheet (mass %) (remainder is Fe and inevitable impurities) | | | | | | | | Sheet thickness | TS | TS after HS |
|---|---|---|---|---|---|---|---|---|---|---|---|
| | C | Si | Mn | P | S | Al | Ti | Mo | B | (mm) | (MPa) | (MPa) |
| Steel sheet A | 0.200 | 0.200 | 1.30 | 0.020 | 0.003 | 0.030 | 0.02 | — | 0.0015 | 1.0 | 600 | 1500 |
| Steel sheet B | 0.130 | 1.50 | 2.2 | 0.020 | 0.003 | 0.008 | 0.03 | — | — | 1.0 | 980 | — |
| Steel sheet C | 0.070 | 0.70 | 2.4 | 0.020 | 0.003 | 0.030 | — | — | — | 1.0 | 780 | — |
| Steel sheet D | 0.065 | 0.50 | 2.00 | 0.020 | 0.010 | 0.030 | — | 0.1 | — | 1.0 | 590 | — |
| Steel sheet E | 0.0012 | 0.08 | 1.32 | 0.048 | 0.004 | 0.050 | 0.009 | — | 0.0003 | 1.0 | 390 | — |
| Steel sheet F | 0.002 | 0.010 | 0.080 | 0.006 | 0.005 | 0.032 | 0.072 | — | — | 0.7 | 270 | — |

The steel sheets A to F were press-formed to door inner panels having the shape shown in FIG. 1A and FIG. 1B using a pressing apparatus shown in FIG. 6A and FIG. 6B.

Figure 13:
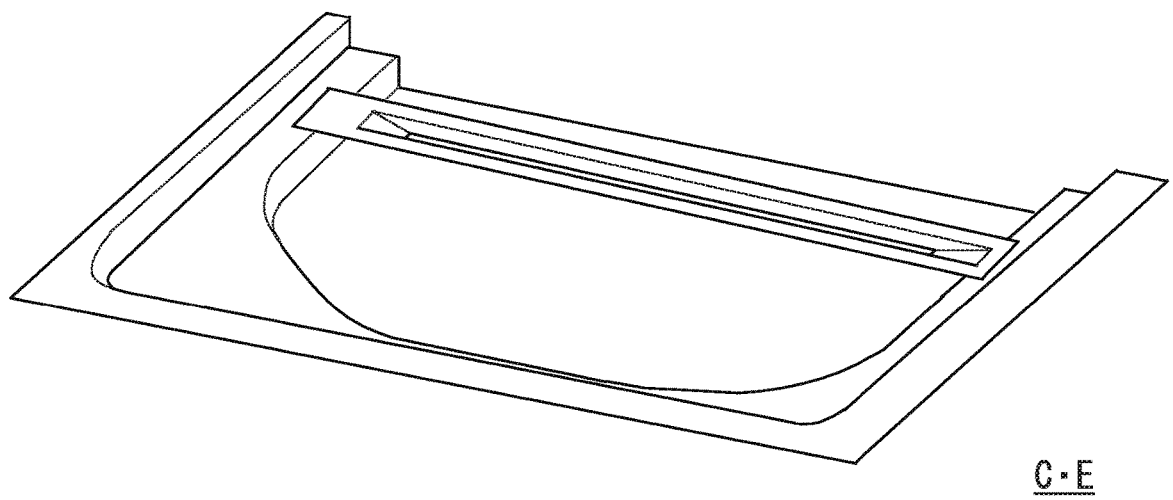
FIG. 13 is a perspective view showing a door inner panel according to a comparative example.

In addition, as comparative examples, door inner panels C and E of the related art shown in FIG. 13 into which a reinforcement member of the same kind of material as each of the door inner panels were press-formed.

An impact four-point bending test was carried out on each of the door inner panels obtained in the above-described manner, and the weight efficiency K (J/g) of the absorption energy with an impact dislocation of 100 mm was obtained. The weight efficiency K is as described below.

Figure 14A:
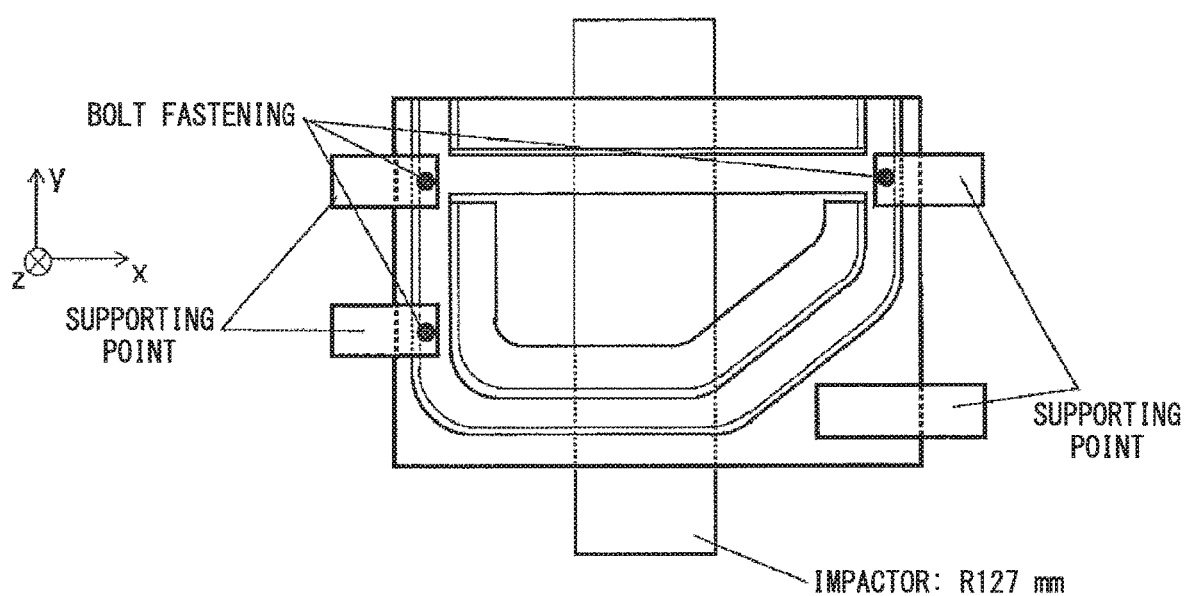
FIG. 14A is a plan view for describing a method for computing a weight efficiency K.
Figure 14B:
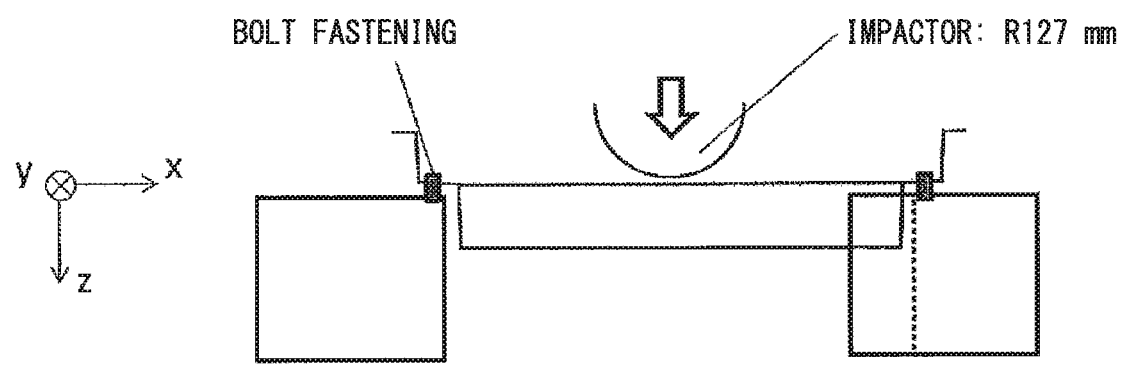
FIG. 14B is a plan view for describing the method for computing the weight efficiency K.

First, as shown in FIG. 14A, three points in the door inner panel were fastened using bolts. In addition, an impactor with R of 127 mm was impacted as shown in FIG. 14B, terms of the impact characteristics and the productivity and a manufacturing method thereof.

BRIEF DESCRIPTION OF THE REFERENCE SYMBOLS 1, 1A, 1B, 1C DOOR INNER PANEL
10 FIRST PANEL PORTION
11 FIRST TOP SHEET PORTION
12 FIRST STANDING WALL PORTION
12a TOP SHEET PORTION-SIDE FIRST STANDING WALL PORTION
12b FLANGE PORTION-SIDE FIRST STANDING WALL PORTION
12c FIRST LEVEL DIFFERENCE PORTION

20 SECOND PANEL PORTION
21 SECOND TOP SHEET PORTION
21a, 21b, 21c, 21d OUTSIDE SIDELINE
22 SECOND STANDING WALL PORTION
22a TOP SHEET PORTION-SIDE SECOND STANDING WALL PORTION
22b FLANGE PORTION-SIDE SECOND STANDING WALL PORTION
22c SECOND LEVEL DIFFERENCE PORTION
30 FLAT SHEET PORTION
31 WALL PORTION
40 FLANGE PORTION
50 OPENING PORTION
60 REINFORCEMENT COMPONENT
A DOOR OUTER PANEL
BL BELT LINE
D DOOR IMPACT BEAM
S STEEL SHEET (BLANK MATERIAL)
100 PRESSING APPARATUS
101 INSIDE PUNCH
102 OUTSIDE PUNCH
103 BLANK HOLDER
104 DIE
S1 FIRST FLAT SHEET PORTION
S2 SECOND FLAT SHEET PORTION
S3 THIRD FLAT SHEET PORTION
S4 OPENING PORTION

What is claimed is:

1. A door inner panel formed of a metal sheet, the door inner panel comprising:
    a first panel portion having a first top sheet portion and a first standing wall portion connected to the first top sheet portion;
    a second panel portion having a second top sheet portion disposed with a gap with the first top sheet portion of the first panel portion and a second standing wall portion connected to the second top sheet portion;
    a flange portion connected to the first standing wall portion and the second standing wall portion; and
    a flat sheet portion disposed between the first panel portion and the second panel portion,
    wherein the first standing wall portion and the second standing wall portion respectively have a level difference portion, and
    both ends of the flat sheet portion are integrated with the flange portion or the level difference portions.

2. The door inner panel according to claim 1,
    wherein an opening portion is formed in at least one of the first top sheet portion and the second top sheet portion.

3. The door inner panel according to claim 1,
    wherein the flat sheet portion has a wall portion connected to the first standing wall portion and the second standing wall portion.

4. The door inner panel according to claim 1, further comprising:
    a reinforcement component connecting the first standing wall portion and the second standing wall portion.

5. The door inner panel according to claim 1,
    wherein at least one of a recessed portion and a protruded portion is formed in the flat sheet portion.

6. The door inner panel according to claim 1,
    wherein a tensile strength is 1,200 MPa or more.

7. The door inner panel according to claim 6,
    wherein a C content is 0.11% to 0.35%, by mass %.

8. The door inner panel according to claim 7,
    wherein a maximum sheet thickness portion $T1_{MAX}$ (mm) in the first top sheet portion, a minimum sheet thickness portion $T1_{MIN}$ (mm) in the first top sheet portion, a maximum sheet thickness portion $T2_{MAX}$ (mm) in the second top sheet portion, and a minimum sheet thickness portion $T2_{MIN}$ (mm) in the second top sheet portion satisfy Expression (1) and Expression (2), $$(T1_{MAX}-T1_{MIN}) \times 100/T1_{MAX} < 15 \qquad \text{Expression (1)}$$

$$(T2_{MAX}-T2_{MIN}) \times 100/T2_{MAX} < 15 \qquad \text{Expression (2).}$$

9. The door inner panel according to claim 1,
    wherein a tensile strength is 340 to 980 MPa.

10. The door inner panel according to claim 9,
    wherein a C content is 0.001% to 0.150%, by mass %.

11. The door inner panel according to claim 10,
    wherein a maximum sheet thickness portion $T1_{MAX}$ (mm) in the first top sheet portion, a minimum sheet thickness portion $T1_{MIN}$ (mm) in the first top sheet portion, a maximum sheet thickness portion $T2_{MAX}$ (mm) in the second top sheet portion, and a minimum sheet thickness portion $T2_{MIN}$ (mm) in the second top sheet portion satisfy Expression (3) and Expression (4), $$(T1_{MAX}-T1_{MIN}) \times 100/T1_{MAX} < 20 \qquad \text{Expression (3)}$$

$$(T2_{MAX}-T2_{MIN}) \times 100/T2_{MAX} < 20 \qquad \text{Expression (4).}$$

12. The door inner panel according to claim 1,
    wherein heights of the first standing wall portion and the second standing wall portion are respectively 40 mm or more.

13. The door inner panel according to claim 1,
    wherein, in the flat sheet portion, a width of a minimum width portion is 30 mm or more, and a width of a maximum width portion is 200 mm or less.

14. A method for manufacturing the door inner panel according to claim 1, the method comprising:
    preparing a blank material which is made of the metal sheet and has a first flat sheet portion, a second flat sheet portion, and a third flat sheet portion disposed between the first flat sheet portion and the second flat sheet portion; and
    carrying out press working in a cold or hot manner on the first flat sheet portion and the second flat sheet portion of the blank material using a pressing apparatus including a die, an inside punch facing the die, an outside punch facing the die and disposed outside the inside punch, and a blank holder and forming the blank material to the door inner panel,
    wherein, in the carrying out of the press working,
    the inside punch is configured to work a region formed in the first top sheet portion of the door inner panel in the first flat sheet portion of the blank material and a region formed in the second top sheet portion of the door inner panel in the second flat sheet portion of the blank material,
    the outside punch is configured to work a region formed in the level difference portion of the door inner panel in the first flat sheet portion of the blank material and a region formed in the level difference portion of the door inner panel in the second flat sheet portion of the blank material, and
    the working of the blank material by the outside punch is completed earlier before the working of the blank material by the inside punch.

15. The method for manufacturing the door inner panel according to claim 14,
    wherein, in the carrying out of the press working, the inside punch and the outside punch further work a part of the third flat sheet portion of the blank material.

16. The method for manufacturing the door inner panel according to claim 14,
  wherein, in the carrying out of the press working, pressing of the blank material by the inside punch begins before pressing of the blank material by the outside punch is completed.

17. The method for manufacturing the door inner panel according to claim 14,
  wherein, in a case in which the carrying out of the press working is carried out in the hot manner, a heating temperature is an Ac3 point or higher.

* * * * *